US010885681B2

(12) United States Patent
Yoo et al.

(10) Patent No.: US 10,885,681 B2
(45) Date of Patent: Jan. 5, 2021

(54) METHOD AND APPARATUS FOR PERFORMING PATH STROKING

(71) Applicant: Samsung Electronics Co., Ltd., Suwon-si (KR)

(72) Inventors: Jeongjoon Yoo, Hwaseong-si (KR); Sundeep Krishnadasan, Bengaluru (IN); Jaedon Lee, Yongin-si (KR); Sangoak Woo, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 15/260,684

(22) Filed: Sep. 9, 2016

(65) Prior Publication Data
US 2017/0076470 A1 Mar. 16, 2017

(30) Foreign Application Priority Data
Sep. 11, 2015 (KR) .................. 10-2015-0129090

(51) Int. Cl.
G06T 11/20 (2006.01)
G06T 1/20 (2006.01)
G06T 11/00 (2006.01)

(52) U.S. Cl.
CPC ............. G06T 11/20 (2013.01); G06T 1/20 (2013.01); G06T 11/001 (2013.01); G06T 11/203 (2013.01)

(58) Field of Classification Search
None
See application file for complete search history.

(56) References Cited

U.S. PATENT DOCUMENTS

| 5,408,598 | A | 4/1995 | Pryor, Jr. |
| 5,977,987 | A * | 11/1999 | Duluk, Jr. ............... G06T 15/10 345/441 |
| 6,784,884 | B1 | 8/2004 | Hsieh |
| 7,564,459 | B2 | 7/2009 | Loop et al. |
| 7,817,152 | B2 | 10/2010 | Kokojima |
| 8,159,499 | B2 | 4/2012 | Siegel et al. |
| 8,306,328 | B2 | 11/2012 | Jakubiak et al. |
| 8,643,644 | B2 | 2/2014 | Wei et al. |
| 9,299,181 | B2 | 3/2016 | Goel et al. |

(Continued)

FOREIGN PATENT DOCUMENTS

| JP | 2002-073001 | 3/2002 |
| JP | 2003-141100 | 5/2003 |

(Continued)

OTHER PUBLICATIONS

C. Loop et al. "Resolution Independent Curve Rendering Using Programmable Graphics Hardware." *ACM Transactions on Graphics (TOG).* ACM, 2005. vol. 24. No. 3. pp. 1000-1009.

(Continued)

*Primary Examiner* — Aaron M Richer
(74) *Attorney, Agent, or Firm* — F. Chau & Associates, LLC

(57) ABSTRACT

A method of performing path stroking includes determining whether or not aliasing based on a primitive included in a path will occur using data about the path, generating a texture to be used for performing path stroking based on a result of the determining, and mapping the texture along an edge of the primitive.

32 Claims, 16 Drawing Sheets

(56) References Cited

U.S. PATENT DOCUMENTS

| | | | |
|---|---|---|---|
| 2003/0025713 A1* | 2/2003 | Wang | G06K 9/222 345/611 |
| 2006/0082593 A1* | 4/2006 | Stevenson | G06T 11/40 345/611 |
| 2007/0268304 A1 | 11/2007 | Hsu | |
| 2007/0279429 A1* | 12/2007 | Ganzer | G06T 13/00 345/582 |
| 2008/0198168 A1 | 8/2008 | Jiao et al. | |
| 2011/0285711 A1 | 11/2011 | Kilgard | |
| 2011/0304638 A1* | 12/2011 | Johnston | G06T 11/40 345/582 |
| 2013/0093784 A1* | 4/2013 | Budhiraja | G06T 5/002 345/611 |
| 2013/0120423 A1* | 5/2013 | Needham | G06T 11/203 345/582 |
| 2014/0015838 A1 | 1/2014 | Yoo et al. | |
| 2014/0043341 A1 | 2/2014 | Goel et al. | |
| 2014/0184633 A1 | 7/2014 | Bolz et al. | |
| 2015/0062124 A1 | 3/2015 | Goel et al. | |
| 2015/0062142 A1 | 3/2015 | Goel et al. | |
| 2015/0178961 A1 | 6/2015 | Karras | |
| 2015/0228094 A1 | 8/2015 | Yoo et al. | |
| 2016/0042561 A1 | 2/2016 | Yoo et al. | |

FOREIGN PATENT DOCUMENTS

| | | |
|---|---|---|
| JP | 2005-250662 | 9/2005 |
| KR | 10-1028699 B1 | 4/2011 |
| KR | 10-2014-0103626 A | 8/2014 |
| KR | 10-2015-0095516 A | 8/2015 |
| KR | 10-2015-0122519 A | 11/2015 |
| WO | 2009-090726 | 7/2009 |

OTHER PUBLICATIONS

M. Kilgard et al. "GPU-Accelerated Path Rendering." *ACM SIGGRAPH, Computer Graphics Proceedings, Annual Conference Series*, Singapore, Nov. 2012,:pp. 1-10.

Extended European Search Report dated Jan. 26, 2017 in corresponding European Patent Appln. No. 16187912.7.

Mark J. Kilgard, et al., "GPU-Accelerated Path Rendering", ACM Transactions on Graphics, vol. 31., No. 6, Article 172, Publication Date: Nov. 2012, pp. 172:1-172:10.

Qin, et al., "Precise Vector Textures for Real-Time 3D Rendering", I3D '08: Proceedings of the 2008 Symposium on Interactive 3D Graphics and Games, ACM, US, Feb. 15, 2008, pp. 199-206.

Office Action dated Oct. 25, 2019 in corresponding European Patent Application No. 16187912.7 (5 pages).

\* cited by examiner

FIG. 1
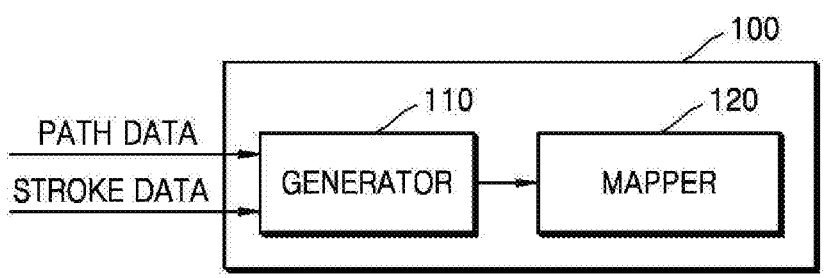
FIG. 2A
FIG. 2B
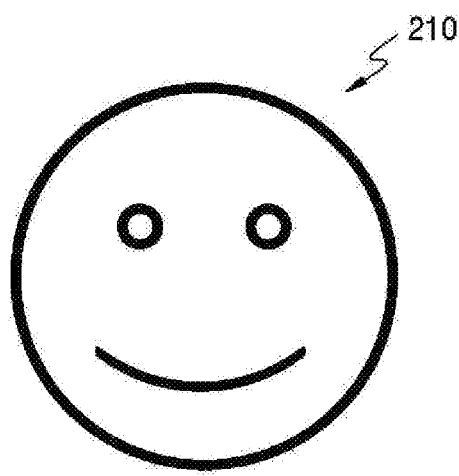
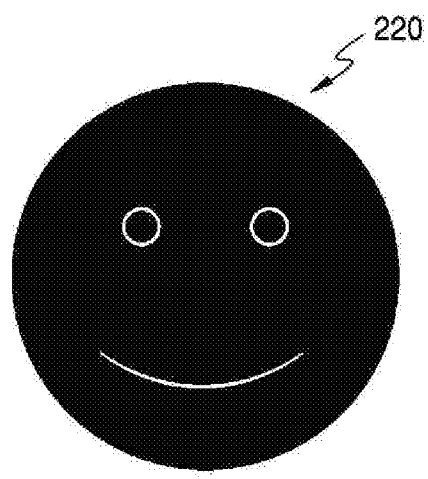

METHOD AND APPARATUS FOR PERFORMING PATH STROKING

CROSS-REFERENCE TO RELATED APPLICATIONS

This application claims the benefit under 35 USC 119(a) of Korean Patent Application No. 10-2015-0129090 filed on Sep. 11, 2015, in the Korean Intellectual Property Office, the entire disclosure of which is incorporated herein by reference for all purposes.

BACKGROUND

1. Field

This disclosure relates to a method and an apparatus for performing path stroking.

2. Description of Related Art

Research is ongoing regarding a method for improving the acceleration performance of a graphics processing unit (GPU) when vector graphics or path rendering is in progress. In the case of path rendering, input data is not composed of triangles, but is composed of a combination of commands and vertices. Therefore, it is difficult to improve the acceleration performance of a GPU during path rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of performing path stroking includes determining whether or not aliasing based on a primitive included in a path will occur using data about the path; generating a texture to be used for performing path stroking based on a result of the determining; and mapping the texture along an edge of the primitive.

The determining may include determining whether or not the aliasing will occur based on a slope of the primitive calculated using the path data.

The determining may include determining that the aliasing will not occur in response to the slope of the primitive having a value of 0 or an infinite value; and determining that the aliasing will occur in response to the slope of the primitive having neither a value of 0 nor an infinite value.

The generating may include generating a first texture using a stroke color in response to a result of the determining being that the aliasing will not occur; and generating a second texture using the stroke color and a color obtained by applying a gradient effect to the stroke color in response to a result of the determining being that the aliasing will occur.

The generating may include generating a first texture corresponding to a stroke width in response to a result of the determining being that the aliasing will not occur; and generating a second texture longer than the stroke width in response to a result of the determining being that the aliasing will occur.

The generating of the second texture may include generating the second texture based on an angle corresponding to a slope of the primitive and the stroke width.

The generating of the second texture may include generating the second texture by applying a stroke color to a portion of the second texture corresponding to the stroke width, and applying a color obtained by applying a gradient effect to the stroke color to a portion of the second texture exceeding the stroke width.

The mapping may include sequentially mapping the texture to certain regions set based on each pixel included in the primitive.

The certain regions include regions having a width corresponding to a width of the texture based on the pixels included in the primitive.

The mapping may include mapping the texture in a direction determined based on a slope of the primitive.

The mapping of the texture in a direction determined based on a slope of the primitive may include mapping the texture in a direction perpendicular to the primitive in response to the slope of the primitive having a value of 0 or an infinite value; mapping the texture in a horizontal direction in response to the slope of the primitive having an absolute value larger than 0 and smaller than 1; and mapping the texture in a vertical direction in response to the slope of the primitive having neither a value of 0 nor an infinite value and having an absolute value equal to or larger than 1.

The method of claim may further include dividing the path into a plurality of primitives in response to the path being a curve; and the determining may include determining whether or not aliasing based on each of the plurality of primitives will occur.

The dividing may include dividing the path that is the curve into the plurality of primitives based on De Casteljau's algorithm.

In another general aspect, a non-transitory computer-readable storage medium stores instructions that, when executed by a processor, cause the processor to perform the method described above.

In another general aspect, an apparatus for performing path stroking includes a generator configured to determine whether or not aliasing based on a primitive included in a path will occur using data about the path, and generate a texture to be used for performing path stroking based on a result of the determining; and a mapper configured to map the texture along an edge of the primitive.

The generator may be further configured to determine whether or not the aliasing will occur based on a slope of the primitive calculated using the path data.

The generator may be further configured to determine that the aliasing will not occur in response to the slope of the primitive having a value of 0 or an infinite value, and determine that the aliasing will occur in response to the slope of the primitive having neither a value of 0 nor an infinite value.

The generator may be further configured to generate a first texture using a stroke color in response to the result of the determining being that the aliasing will not occur, and generate a second texture using the stroke color and a color obtained by applying a gradient effect to the stroke color in response to the result of the determining being that the aliasing will occur.

The generator may be further configured to generate a first texture corresponding to a stroke width in response to the result of the determining being that the aliasing will not occur, and generate a second texture longer than the stroke width in response to the result of the determining being that the aliasing will occur.

The generator may be further configured to generate the second texture based on an angle corresponding to a slope of the primitive and the stroke width.

The generator may be further configured to generate the second texture by applying a stroke color to a portion of the second texture corresponding to the stroke width, and applying a color obtained by applying a gradient effect to the stroke color to a portion of the second color exceeding the stroke width.

The mapper may be further configured to sequentially map the texture to certain regions set based on each pixel included in the primitive.

The certain regions include regions having a width corresponding to a width of the texture based on the pixels included in the primitive.

The mapper may be further configured to map the texture in a direction determined based on a slope of the primitive.

The mapper may be further configured to map the texture in a direction perpendicular to the primitive in response to the slope of the primitive having a value of 0 or an infinite value, map the texture in a horizontal direction in response to the slope of the primitive having an absolute value larger than 0 and smaller than 1, and map the texture in a vertical direction in response to the slope of the primitive having neither a value of 0 nor an infinite value and having an absolute value equal to or larger than 1.

The apparatus may further include a divider configured to divide the path into a plurality of primitives in response to the path being a curve; and the generator may be further configured to determine whether or not aliasing based on each of the plurality of primitives will occur.

The divider may be further configured to divide the path that is the curve into the plurality of primitives based on De Casteljau's algorithm.

In another general aspect, a central processing unit (CPU) is connected to a graphics processing unit (GPU), the CPU is configured to determine whether or not aliasing based on a primitive included in a path will occur using data about the path, request the GPU to generate a texture based on a result of the determining, receive the texture from the GPU, and map the texture along an edge of the primitive; and the GPU is configured to receive the request to generate the texture from the CPU, and generate the texture in response to the request.

The CPU may be further configured to store the texture in the CPU.

The GPU may be further configured to store the texture in the GPU.

In another general aspect, a graphics processing unit (GPU) is connected to a central processing unit (CPU), and the GPU is further configured to determine whether or not aliasing based on a primitive included in a path will occur using data about the path, generate a texture based on a result of the determining; and map the texture along an edge of the primitive.

The CPU may be further configured to store the data about the path in the CPU; and the GPU may be further configured to receive the data about the path from the CPU.

In another general aspect, an apparatus for performing path stroking includes a generator configured to generate a texture effective to counteract any aliasing occurring during stroking along a primitive using data about a path including the primitive; and a mapper configured to perform stroking by mapping the texture along the primitive.

The generator may be further configured to determine whether or not aliasing will occur during the stroking using the data about the path, generate a first texture not including an anti-aliasing portion in response to a result of the determining being that aliasing will not occur during the stroking, and generate a second texture including an anti-aliasing portion in response to a result of the determining being that the aliasing will occur during the stroking; and the mapper may be further configured to perform the stroking by mapping the one of the first texture and the second texture that has been generated along the primitive.

The generator may be further configured to generate the first texture by applying a stroke color to a portion of the first texture having a length equal to a stroke width, the first texture not including any other portion; and generate the second texture by applying the stroke color to a first portion of the second texture having a length equal to the stroke width, and applying a color obtained by applying a gradient effect to the stroke color to a second portion of the second texture.

The mapper may be further configured to perform the stroking by mapping the texture along the primitive so that one end of the texture is on the primitive and the texture extends away from the primitive.

The mapper may be further configured to perform the stroking by mapping the texture along the primitive so that one end of the texture is on the primitive and the texture extends away from the primitive in opposite directions to obtain a final stroke width equal to twice a width of the texture.

Other features and aspects will be apparent from the following detailed description, the drawings, and the claims.

BRIEF DESCRIPTION OF THE DRAWINGS

FIG. 1 is a diagram showing a configuration of an example of a stroke apparatus.

FIGS. 2A and 2B are diagrams illustrating examples of stroking and filling.

DETAILED DESCRIPTION

Figure 3:
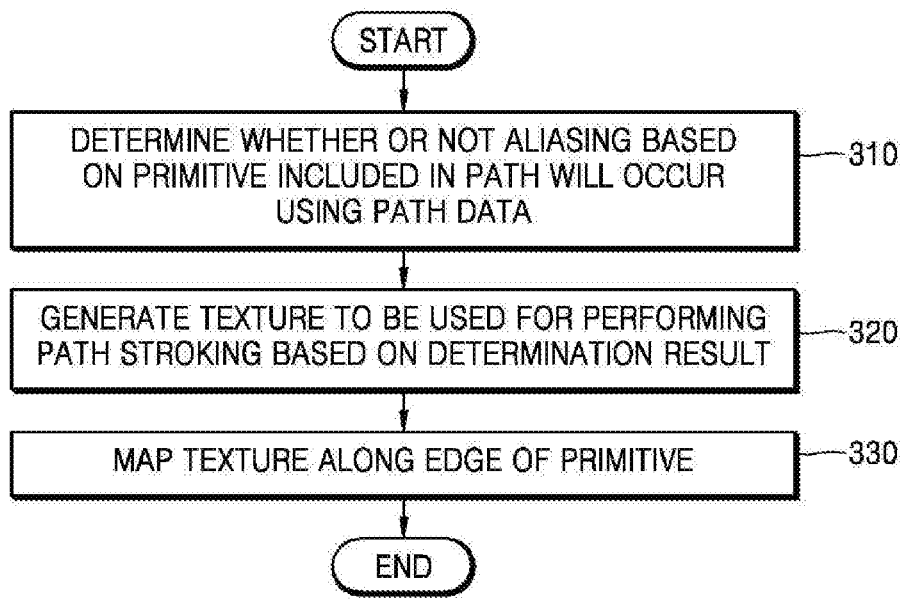
FIG. 3 is a flowchart illustrating an example of a method of path rendering performed by a stroke apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the terminology used in this specification, general terms currently in wide use have been selected wherever possible in consideration of the functions described in the specification, but may vary according to intentions of one of ordinary skill in the art, legal precedents, the advent of new technology, and other factors. Some terms may have been arbitrarily selected, and in such cases, the detailed meanings of the terms have been stated in the corresponding description. Therefore, the terms used in this specification are to be defined based on the meanings of the terms together with the description throughout the specification, rather than their simple names of the terms.

Throughout the specification, when a portion "includes" an element, unless otherwise described, another element may be further included, rather than the presence of other elements being excluded.

FIG. 1 is a diagram showing a configuration of an example of a stroke apparatus.

Referring to FIG. 1, a stroke apparatus 100 includes a generator 110 and a mapper 120. In the stroke apparatus 100 shown in FIG. 1, only components related to this example are shown. Therefore, in addition to the components shown in FIG. 1, other general-use components involved in performing rendering may be further included. Also, the stroke apparatus 100 may be implemented as a central processing unit (CPU), a graphics processing unit (GPU), or a hardware accelerator (HWA).

A path is elements constituting an object that is a target of rendering. In other words, the object may include a closed polygon or a closed path that is formed by connecting at least one path. For example, a path may correspond to a line or a curve. A primitive is an element used for rendering, representing a detailed unit of an object or a path. In some cases, a path and a primitive may indicate the same thing.

Path data input to the stroke apparatus 100 includes information on coordinates of each of a plurality of vertices included in a path and commands for configuring the path by combining the vertices. The vertices may include a vertex corresponding to a start position of the path and a vertex corresponding to an end position of the path, and may further include a control point for controlling an intermediate position in the case of a curve.

For example, when a line from a first pixel to a second pixel among pixels included in a frame is assumed to be a path, vertices represent points corresponding to each of the first and second pixels. Therefore, the path data may include coordinates of a first vertex corresponding to the first pixel, coordinates of a second vertex corresponding to the second pixel, and a command to draw a line from the first vertex to the second vertex.

For this reason, referring to the path data, it is possible to obtain information on a position and a progress direction of the path as well as information on coordinates of each vertex constituting the path. When the path is assumed to be a line, it is also possible to obtain information on the slope of the line based on the path data. Also, the path data may also include information on color values to be set for each pixel.

Stroke data input to the stroke apparatus 100 includes at least one piece of information among a stroke width, a stroke color, and a background color. Stroking represents a process of coloring pixels corresponding to the contour of an object. Since an object is composed of at least one path or at least one primitive, stroking represents a process of coloring pixels corresponding to the path or the primitive. Therefore, as the stroke apparatus 100 receives stroke data, the stroke color is displayed in pixels corresponding to the stroke width. A stroke is described below with reference to FIGS. 2A to 2B.

FIGS. 2A and 2B are diagrams illustrating examples of stroking and filling.

FIG. 2A shows an example of stroking performed on an object 210 by the stroke apparatus 100, and FIG. 2B shows an example of filling performed on an object 220 by the stroke apparatus 100.

Referring to FIG. 2A, contours of the object 210 are displayed in one color. In other words, a certain color is shown in the contours of the object 210 so that the object 210 is distinguished from the background. The stroke apparatus 100 displays primitives corresponding to the contours in a stroke color. The stroke apparatus 100 performs stroking by inputting the stroke color to pixels corresponding to the primitives.

Meanwhile, referring to FIG. 2B, inner regions of the object 220 are displayed in a single color. Contours of the object 220 are in the same color as the background. In other words, the stroke apparatus 100 performs filling by inputting a certain color to pixels corresponding to the inner regions of the object 220.

Referring back to FIG. 1, the generator 110 generates a texture based on a determination result. The texture is an image that is used by the stroke apparatus 100 to perform stroking. As the generator 110 generates the texture, the mapper 120 maps the texture to pixels included in a certain region.

The generator 110 determines whether or not aliasing based on a primitive included in a path will occur using path data. For example, the generator 110 calculates the slope of the primitive using the path data, and determines whether or not aliasing will occur based on the calculated slope.

For example, when it is determined that aliasing will not occur, the generator 110 generates a texture using the stroke color. On the other hand, when it is determined that aliasing will occur, the generator 110 generates a texture using the stroke color and a color obtained by applying a gradient effect to the stroke color (referred to as "gradient color" below).

In other words, the generator 110 generates a texture without a color change for a primitive in which aliasing will not occur, and generates a texture with a color change for a primitive in which aliasing will occur.

The mapper 120 maps the textures along the edge of the primitive. For example, the mapper 120 sequentially maps the generated texture to certain regions set based on each pixel included in the primitive. The certain regions are regions having an area corresponding to the area of the texture based on the pixels included in the primitive.

As described above, a texture with a color change is generated for a primitive in which aliasing will occur. A portion of the texture with a color change is a portion for providing an anti-aliasing effect. Accordingly, the mapper 120 maps the texture with a color change, so that a result in which anti-aliasing as well as stroking has been performed is output. In other words, since the stroke apparatus 100 simultaneously performs a stroking operation and an anti-aliasing operation, the amount of calculations necessary for operation of the stroke apparatus 100 is reduced, enabling rendering to be performed at a high speed.

An example of an operation of the stroke apparatus 100 is described in detail below with reference to FIG. 3.

FIG. 3 is a flowchart illustrating an example of a method of performing path rendering performed by a stroke apparatus.

Referring to FIG. 3, a method of performing path rendering includes operations that are performed in sequence in the stroke apparatus 100 shown in FIG. 1. Therefore, the description of the stroke apparatus 100 shown in FIG. 1 provided above, even if omitted below, is also applicable to the method of performing path rendering illustrated in FIG. 3.

In operation 310, the generator 110 determines whether or not aliasing based on a primitive included in a path will occur using path data. For example, the generator 110 determines whether or not aliasing will occur based on a slope of the primitive.

In operation 320, the generator 110 generates a texture to be used for performing path stroking based on the determination result. The generator 110 generates the texture using information included in stroke data according to whether or not aliasing will occur. The generated texture may be stored in a memory (not shown) of the stroke apparatus 100.

In one example, when it is determined that aliasing will not occur, the generator 110 generates a texture using a stroke color. On the other hand, when it is determined that aliasing will occur, the generator 110 generates a texture using a stroke color and a gradient color.

In another example, when it is determined that aliasing will not occur, the generator 110 generates a texture corresponding to a stroke width. On the other hand, when it is determined that aliasing will occur, the generator 110 generates a texture longer than a stroke width.

Examples in which the generator 110 determines whether or not aliasing will occur and generates a texture are described below with reference to FIGS. 4 to 6.

Figure 4:
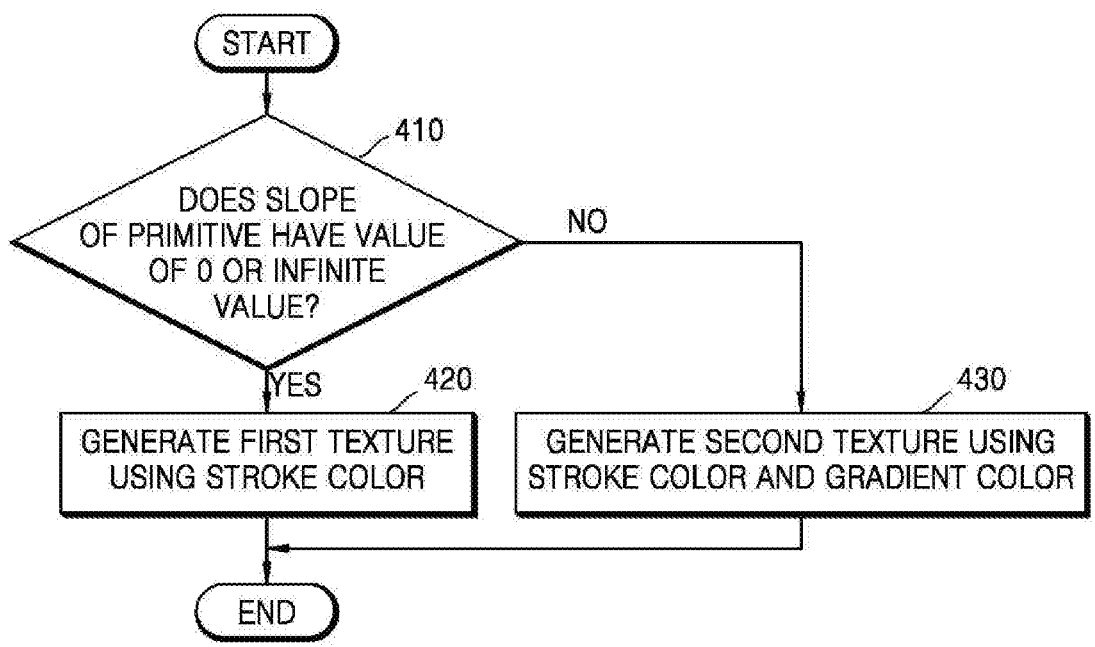
FIG. 4 is a flowchart illustrating an example in which a generator determines whether or not aliasing will occur and generates a texture.

FIG. 4 is a flowchart illustrating an example in which a generator determines whether or not aliasing will occur and generates a texture.

In operation 410, the generator 110 determines whether or not the slope of a primitive has a value of 0 or an infinite value. The slope of the primitive having a value of 0 or an infinite value indicates that aliasing based on the primitive does not occur. For example, assuming that the primitive is a line, the slope of the line having a value of 0 indicates that the line has been drawn in a horizontal direction. Also, the slope of the line having an infinite value indicates that the line has been drawn in a vertical direction. The horizontal direction and the vertical direction represent directions in which a line is drawn in a frame.

On the other hand, the slope of a primitive having neither a value of 0 nor an infinite value indicates that aliasing based on the primitive will occur. For example, assuming that the primitive is a line, when the line has been drawn in a diagonal direction in the frame, the slope of the line has neither a value of 0 nor an infinite value.

For example, the generator 110 calculates the slope of a primitive with reference to path data. The path data includes information on coordinates of each plurality of vertices included in a path and commands for configuring the path by combining the vertices. Therefore, the generator 110 determines a start vertex and an end vertex of the primitive with reference to the path data, and determines whether the primitive is a line or a curve. When the primitive is a line, the generator 110 calculates the slope of the line. In brief, with reference to the path data, the generator 110 determines whether or not the slope of the primitive has a value of 0 or an infinite value. When the slope of the primitive has a value of 0 or an infinite value, the process proceeds to operation 420. Otherwise, the process proceeds to operation 430. Operations 420 and 430 are described below.

An example of a correlation between the slope of a primitive and the occurrence of aliasing are described below with reference to FIG. 5.

Figure 5:
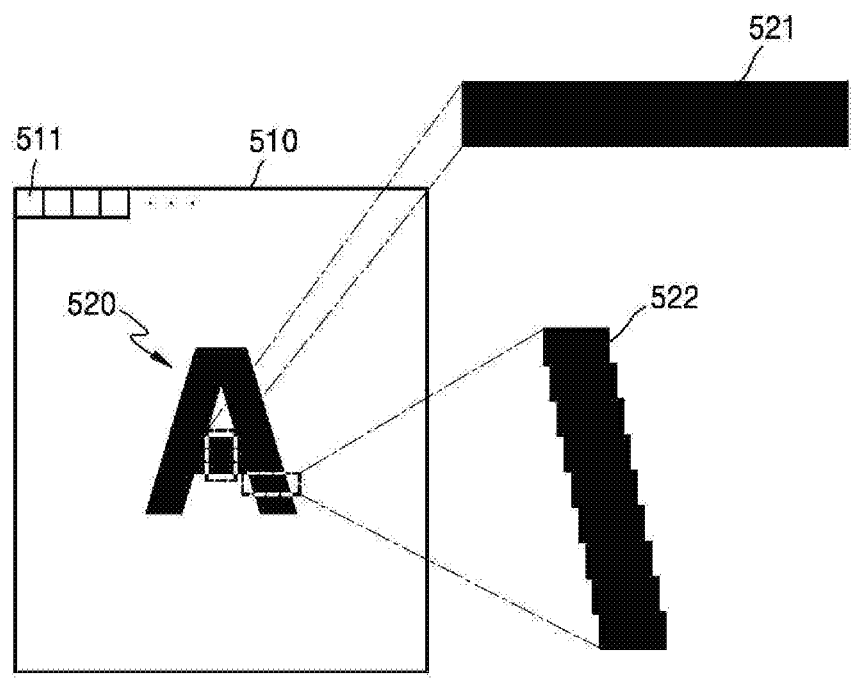
FIG. 5 is a diagram illustrating an example of a correlation between the slope of a primitive and the occurrence of aliasing.

FIG. 5 is a diagram illustrating an example of a correlation between the slope of a primitive and the occurrence of aliasing.

FIG. 5 shows an example of an object 520 drawn in a frame 510. The frame 510 is composed of a plurality of pixels 511. For example, 1024×768 pixels may be arranged in a matrix form to constitute the frame 510. However, the number of pixels included in the frame 510 is not limited to 1024×768.

As the stroke apparatus 100 performs rendering of the object 520, colors are set for pixels corresponding to primitives. Accordingly, the shape of the object 520 that has undergone rendering is output in the frame 510.

The following description assumes that a transverse direction of the frame 510 is a horizontal direction and a longitudinal direction of the frame 510 is a vertical direction. However, the horizontal direction and the vertical direction may be interchanged according to the direction of looking at the frame 510.

Some of the primitives constituting the object 520 may be drawn in a horizontal direction or a vertical direction, such as a primitive 521 of FIG. 5. Therefore, when a color is set for pixels corresponding to the primitive 521 among the plurality of pixels 511 included in the frame 510, the shape of the primitive 521 is output in the frame 510 without distortion.

When the horizontal direction of the frame 510 is designated as an x-axis direction and the vertical direction is designated as a y-axis direction to set coordinates, the slope of the primitive 521 is 0. On the other hand, when the vertical direction of the frame 510 is designated as the x-axis direction and the horizontal direction is designated as the y-axis direction to set coordinates, the slope of the primitive 521 is infinite. In other words, the primitive 521 is formed in a direction in which the pixels 511 are arranged. Therefore, when a color is set for pixels corresponding to the primitive 521, the shape of the primitive 521 is expressed without distortion.

In brief, when the slope of the primitive 521 is 0 or infinite, the primitive 521 is output in the frame 510 without distortion. Therefore, aliasing based on the primitive 521 does not occur.

Meanwhile, other primitives constituting the object 520 may be drawn as diagonal lines, such as a primitive 522 of FIG. 5. As described above, the pixels 511 in the frame 510 are arranged in a matrix form. Therefore, when a color is set for pixels corresponding to the primitive 522, the shape of the primitive 522 (the contour of the primitive 522) is output in the frame 510 in a distorted state.

When coordinates are set using the horizontal direction and the vertical direction of the frame 510 as axes, the slope of the primitive 522 is neither 0 nor an infinite value. In brief, when the slope of the primitive 522 is neither 0 nor an infinite value, the primitive 522 is distorted and output in the frame 510. Therefore, aliasing based on the primitive 522 occurs.

The generator 110 generates different textures according to whether or not aliasing will occur. In particular, when it is determined that aliasing will occur as in the primitive 522, the generator 110 generates a texture using a stroke color and a gradient color. Therefore, as the mapper 120 maps the texture to a region including the primitive 522, a stroking operation and an anti-aliasing operation are simultaneously performed.

The texture generated for the primitive 522 by the generator 110 may be mapped to straight lines that have all pixels in the primitive 522 as start points and points present at ½ of a stroke width in a direction perpendicular to the primitive 522 as end points. This is because a stroke width and a path stroke color defined by a user are constant in the same primitive. For example, when a stroke width defined by the user is 10, a texture having a stroke width of 5 is generated and mapped onto a straight line that has an arbitrary point on the primitive as a start point and points away from the primitive by a width of 5 in both directions perpendicular to the primitive as end points.

When the stroke width defined by the user is 2W, a width in one direction from a primitive perpendicular to the primitive, that is, a "stroke width," is W. The stroke width W referred to below represents a width in one direction perpendicular to a primitive.

Referring back to FIG. 4, in operation 420, the generator 110 generates a first texture using a stroke color. For example, the generator 110 generates a first texture whose entire region is set to the stroke color.

The generator 110 checks a stroke width with reference to stroke data. Then, the generator 110 generates the first texture so that the stroke color is set for pixels corresponding to the stroke width. In other words, the first texture is generated so that the same color is set for all pixels included in the first texture. An example of the first texture is described below with reference to FIG. 6.

Figure 6:
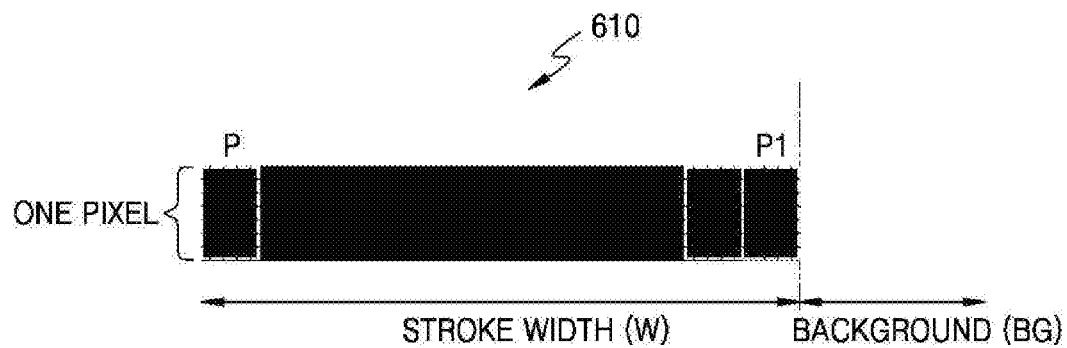
FIG. 6 is a diagram illustrating an example of a first texture.

FIG. 6 is a diagram illustrating an example of a first texture according.

In FIG. 6, an example of a first texture 610 is shown. The generator 110 obtains information on a stroke color and a stroke width W from stroke data and sets the stroke color for pixels corresponding to the stroke width W, thereby generating the first texture 610.

The height of the first texture 610 corresponds to the height of a single pixel. In other words, the first texture 610 has the form of pixels arranged in one line having a length corresponding to the stroke width W. For example, assuming that the stroke width W is 10 and the stroke color is black, the generator 110 generates the first texture 610 in the form of 10 pixels from a pixel P to a pixel P1 that are set in black and arranged in one line. The pixel P is a pixel included in a primitive, and the area to the right of the pixel P1 corresponds to a background BG.

Referring back to FIG. 4, in operation 430, the generator generates a second texture using the stroke color and a gradient color. For example, the generator 110 generates a second texture in which a partial region is set in the stroke color and the remaining region is set in the gradient color.

The generator 110 checks the stroke width with reference to the stroke data. Then, the generator 110 generates the partial region of the second texture so that pixels corresponding to the stroke width are set in the stroke color. Also, the generator 110 generates the remaining region of the second texture so that pixels corresponding to a certain width are set in the gradient color. In other words, the second texture is generated so that two or more colors are set for pixels included in the second texture. An example of the second texture is described below with reference to FIG. 7.

Figure 7:
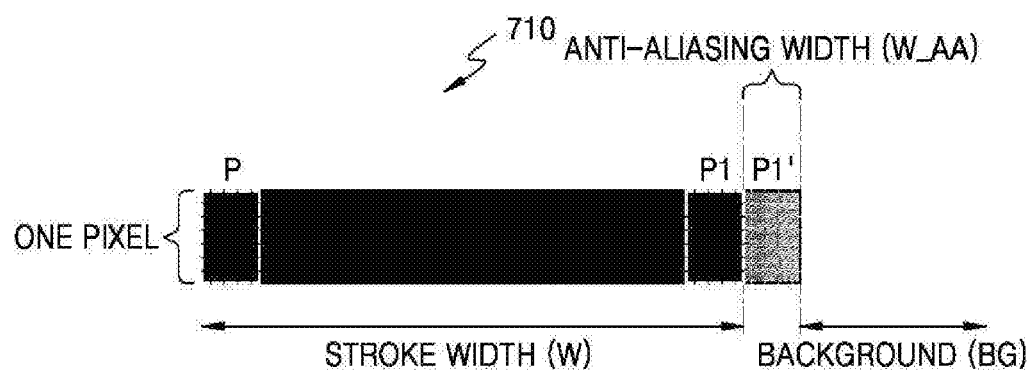
FIG. 7 is a diagram illustrating an example of a second texture.

FIG. 7 is a diagram illustrating an example of a second texture.

In FIG. 7, an example of a second texture 710 is shown. The generator 110 obtains information on the stroke color and the stroke width W from the stroke data. Then, the generator 110 sets the stroke color for pixels corresponding to the stroke width W, and sets the gradient color for pixels corresponding to an anti-aliasing width W_AA, thereby generating the second texture 710.

The height of the second texture 710 corresponds to the height of a single pixel. In other words, the second texture 710 has the form of pixels arranged in one line having a length corresponding to the stroke width W and the anti-aliasing width W_AA. For example, assuming that the stroke width W is 10, the anti-aliasing width W_AA is 1, the stroke color is black, and a background color is white, the generator 110 sets 10 respective pixels from a pixel P to a pixel P1 in black and sets a pixel P1' in a gradient color that gradually changes from black to white. Then, the generator 110 generates the second texture 710 in the form of the 11 pixels arranged in one line. The pixel P is a pixel included in a primitive, and the area to the right of the pixel P1' corresponds to a background BG.

The anti-aliasing width W_AA is calculated by the generator 110 as described below with reference to FIGS. 8 and 9.

Figure 8:
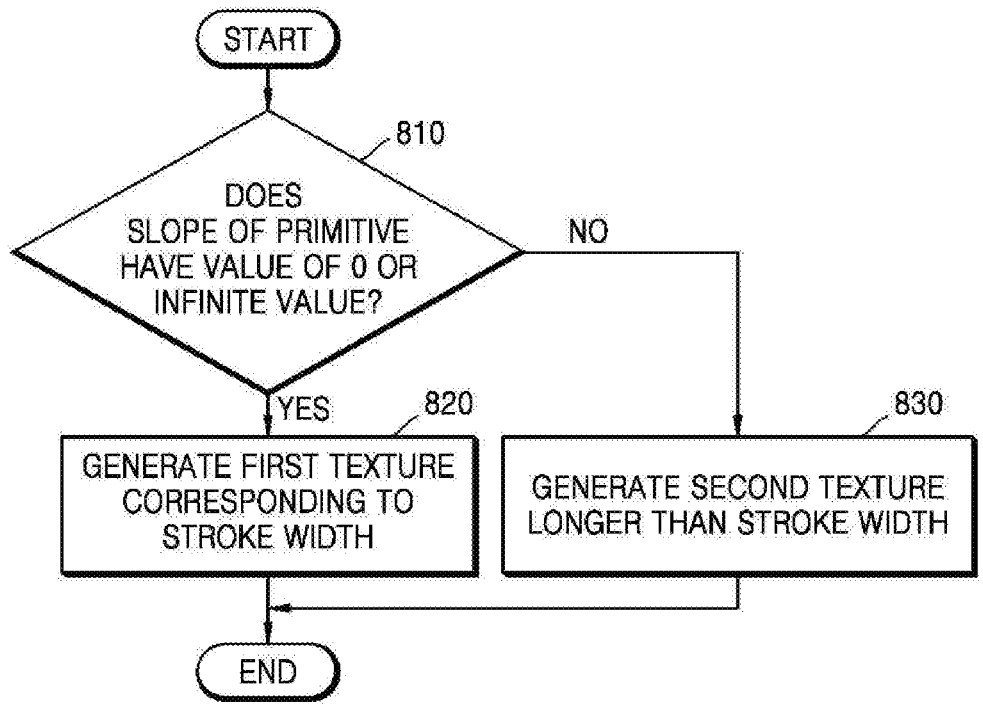
FIG. 8 is a flowchart illustrating another example in which a generator determines whether or not aliasing will occur and generates a texture.

FIG. 8 is a flowchart illustrating another example in which a generator determines whether or not aliasing will occur and generates a texture.

Operation 810 of FIG. 8 corresponds to operation 410 of FIG. 4. Therefore, a detailed description of operation 810 is omitted below.

In operation 820, the generator 110 generates a first texture corresponding to a stroke width.

In operation 830, the generator 110 generates a second texture longer than a stroke width. In one example, the generator 110 generates the second texture based on an angle corresponding to the slope of the primitive and the stroke width. In other words, the generator 110 separately calculates the width of a region for which the stroke color will be set (a region corresponding to W of FIG. 7) and the width of a region for which the gradient color will be set (a region corresponding to W_AA of FIG. 7) according to an angle corresponding to the slope of the primitive and the stroke width. An example in which the generator 110 generates a second texture based on an angle corresponding to the slope of a primitive and a stroke width is described below with reference to FIG. 9.

Figure 9:
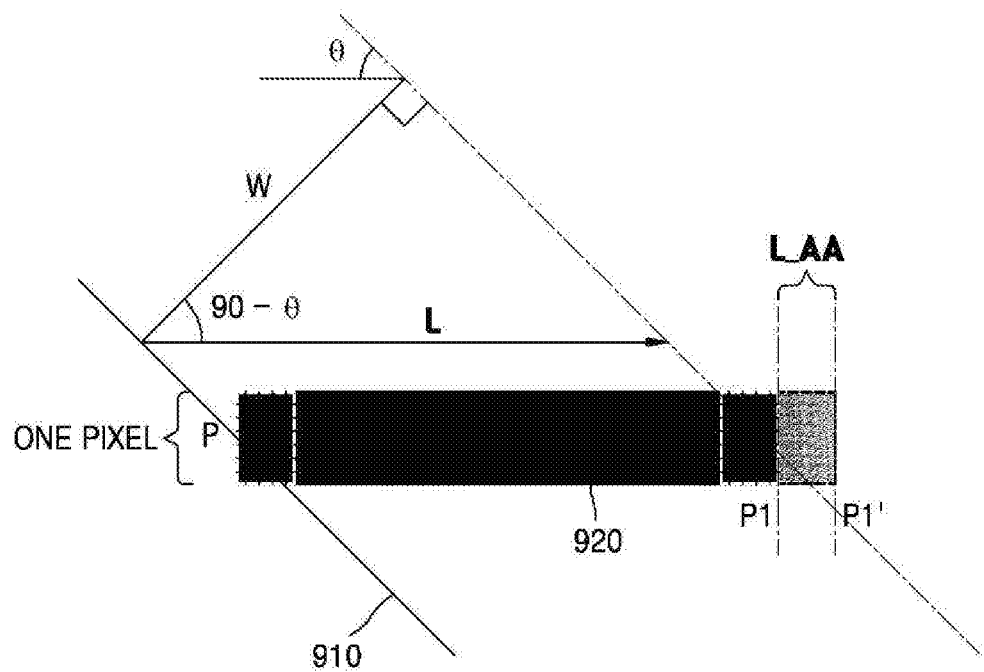
FIG. 9 is a diagram illustrating an example in which a generator generates a second texture.

FIG. 9 is a diagram illustrating an example in which a generator generates a second texture.

In FIG. 9, an example of a primitive 910 and an example of a second texture 920 are shown. The generator 110 calculates a first width L and a second width L_AA based on an angle θ corresponding to the slope of the primitive 910 and a stroke width W. The first width L represents the width of a region for which the stroke color will be set, and the second width L_AA represents the width of a region for which the gradient color will be set.

In one example, the generator 110 calculates the first width L according to Equation 1 below.

$$L = \frac{W}{\cos(90 - \theta)} \quad (1)$$

In Equation 1, L represents a first width, W represents a stroke width, θ represents the angle corresponding to the slope of the primitive 910, and 90-θ is the complement of the angle θ expressed in degrees.

Also, the generator 110 calculates the second width L_AA according to Equation 2 below.

$$L\_AA = \frac{W\_AA \cdot L}{W} \quad (2)$$

In Equation 2, L_AA represents a second width, W_AA represents an anti-aliasing width, L represents a first width, and W represents a stroke width.

In general, the anti-aliasing width W_AA may be set to 1. Assuming that the anti-aliasing width W_AA is 1, substitution of Equation 1 into Equation 2 yields Equation 3 below.

$$\begin{aligned}L_{AA} &= \frac{W\_AA \cdot L}{W} \quad (3)\\ &= \frac{W\_AA}{\cos(90-\theta)}\\ &= \frac{1}{\cos(90-\theta)}\end{aligned}$$

Referring to Equation 1 to Equation 3 described above, as the slope of the primitive 910 becomes smaller (as θ becomes smaller), the first width L becomes larger, and the second width L_AA also becomes larger in proportion to the first width L. In Equation 3, 90-θ is the complement of θ expressed in degrees.

The generator 110 calculates the first width L and the second width L_AA according to Equations 1 and 3, obtains information on the stroke color from stroke data, and generates the second texture 920 based on the first width L, the second width L_AA, and the information on the stroke color.

An object may be composed of a combination of different paths or different primitives. Therefore, a region in which different primitives overlap (referred to as an "overlapping region" below) may be generated. In one example, in addition to the first texture and the second texture described above, the generator 110 generates a third texture to be mapped to an overlapping region, and generates a fourth texture to be mapped to an end of a primitive. Examples in which the generator 110 separately generates a third texture and a fourth texture are described below with reference to FIGS. 10 and 11.

Figure 10:
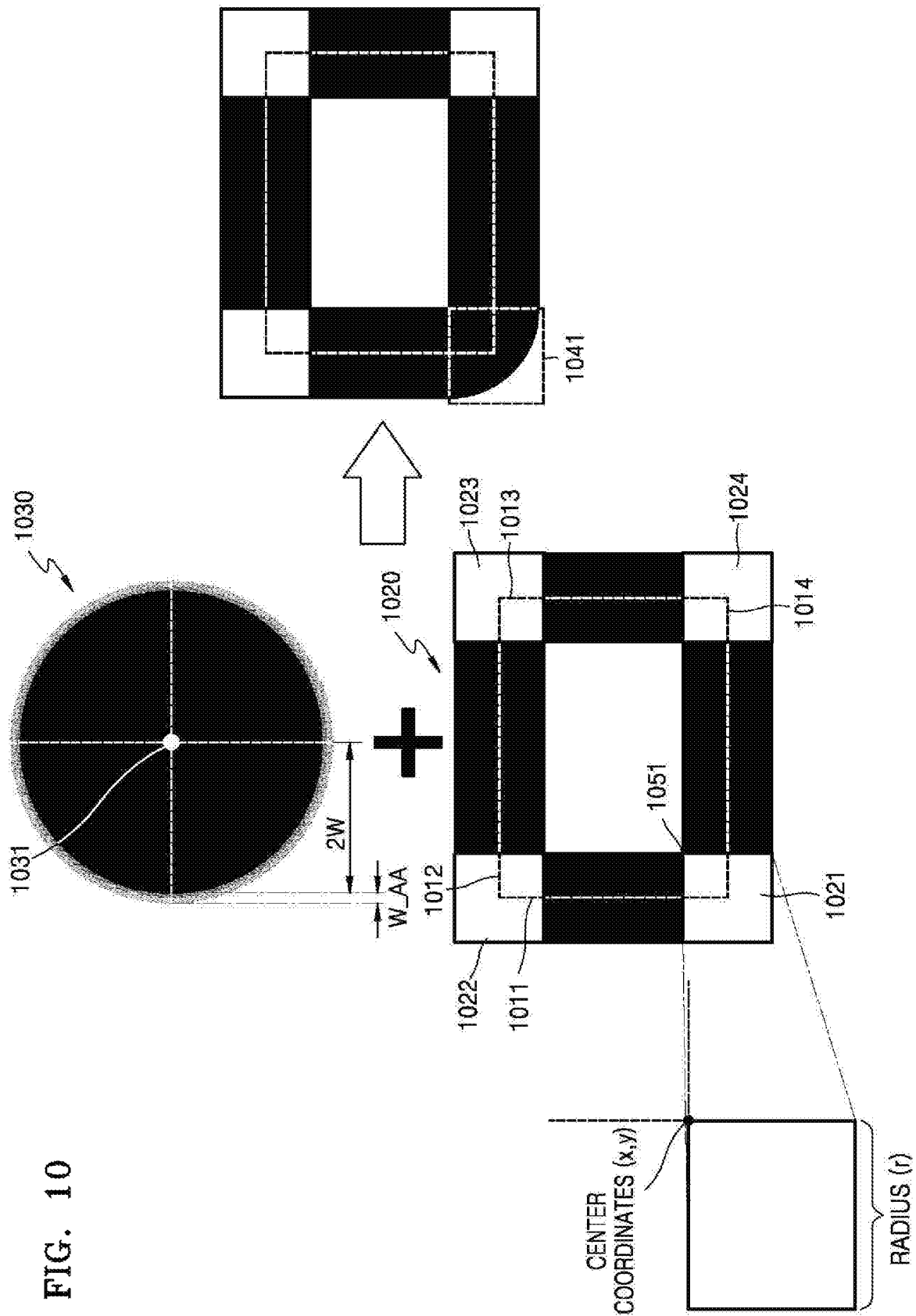
FIG. 10 is a diagram illustrating an example in which a generator generates a third texture.

FIG. 10 is a diagram illustrating an example in which a generator generates a third texture.

In FIG. 10, an example of an object 1020 formed by four different primitives 1011, 1012, 1013, and 1014 is shown. The object 1020 of FIG. 10 is shown as a rectangle that is generated by combining the four different primitives 1011, 1012, 1013, and 1014 and performing a stroking operation on the primitives 1011, 1012, 1013, and 1014. However, the shape of an object is not limited to a rectangle, and objects having various shapes may be generated according to a combination of a plurality of primitives.

As the stroking operation is performed on the primitives 1011, 1012, 1013, and 1014, four different overlapping regions 1021, 1022, 1023, and 1024 are generated. In addition to the first texture or the second texture described above, the generator 110 generates a third texture 1030 to be mapped to each of the overlapping regions 1021, 1022, 1023, and 1024.

For example, the generator 110 generates the third texture 1030 in a circular shape. The third texture 1030 is generated as a combination of the stroke color and the gradient color, like the second texture. When the third texture 1030 is in a circular shape, the contour of the third texture 1030 is not implemented by pixels arranged in only the horizontal or vertical direction of a frame. In other words, when the third texture 1030 is in a circular shape, aliasing based on a primitive having a shape corresponding to the third texture 1030 will occur.

Therefore, the generator 110 generates the third texture 1030 based on the stroke color and the gradient color. The generator 110 applies the stroke color to a region included in a radius r from a center point 1031. The radius r is equal to the stroke width of 2W defined by the user referred to above in connection with FIG. 5. Also, the generator 110 applies the gradient color to a certain region adjacent to the region to which the stroke color is applied. The certain region is determined based on the anti-aliasing width W_AA. The generated third texture 1030 may be stored in the memory (not shown) of the stroke apparatus 100.

The mapper 120, which is described below, maps the third texture 1030 to each of the overlapping regions 1021, 1022, 1023, and 1024. For example, the mapper 120 maps a portion of the third texture 1030 (e.g., a quarter section of the third texture 1030) to the overlapping region 1021 by setting coordinates (x, y) of the center point 1031 of the third texture 1030 to a point 1051 at an inside corner of the overlapping region 1021 formed by the stroking operation performed on the primitives 1011 and 1014. An angle for generating a portion (e.g., 1041) of the third texture 1030 to be mapped to an overlapping region formed by a stroking operation performed on two primitives is equal to the external angle (180 degrees—internal angle) formed by the two primitives. For example, the external angle of the two primitives 1011 and 1014 is 90 degrees, and thus a portion (90 degrees, i.e., a quarter section) of the third texture 1030 is mapped to the overlapping region 1021. Accordingly, a result 1041 in which the portion of the third texture 1030 is mapped to the overlapping region 1021 is output.

Figure 11:
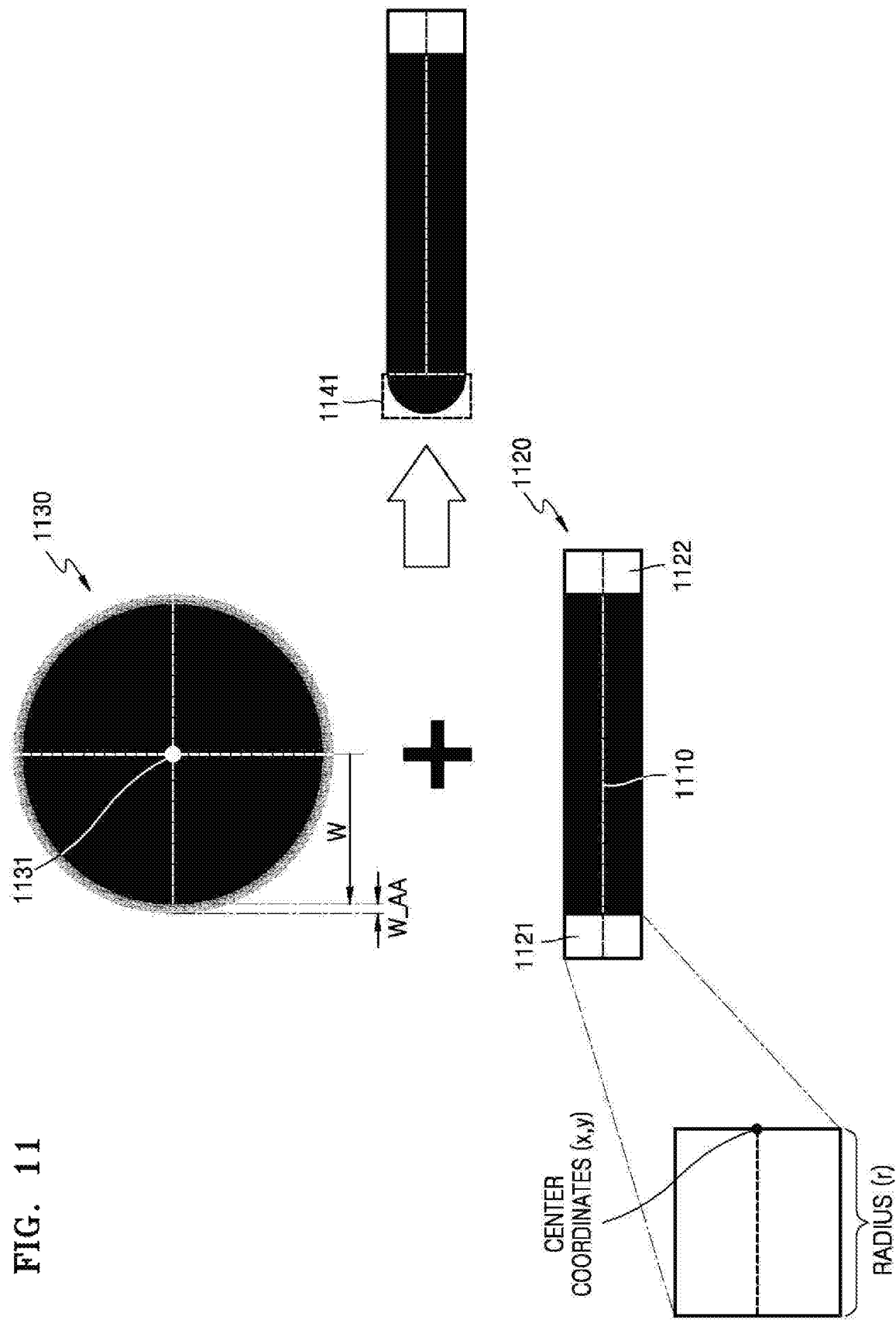
FIG. 11 is a diagram illustrating an example in which a generator generates a fourth texture.

FIG. 11 is a diagram illustrating an example in which a generator generates a fourth texture.

In FIG. 11, an example of an object 1120 formed by a primitive 1110 is shown. The object 1120 of FIG. 11 is shown as a line that is generated by performing a stroking operation on the primitive 1110.

As the stroking operation is performed on the primitive 1110, two end regions 1121 and 1122 are generated. In addition to the first texture and the second texture described above, the generator 110 generates a fourth texture 1130 to be mapped to each of the end regions 1121 and 1122.

For example, the generator 110 generates the fourth texture 1130 in a circular shape. In this example, the fourth texture 1130 is the same as the third texture 1030 of FIG. 10, except that the radius r from a center point 1131 of a region to which the stroke color is applied in the fourth texture 1130 is equal to the stroke width W as shown in FIG. 11, rather than to the stroke width 2W defined by the user as shown in FIG. 10. Therefore, a detailed process of the generator 110 generating the fourth texture 1130 will not be described. The generated fourth texture 1130 may be stored in the memory (not shown) of the stroke apparatus 100.

The mapper 120, which is described below, maps the fourth texture 1130 to each of the end regions 1121 and 1122. For example, the mapper 120 maps a portion of the fourth texture 1130 (e.g., a half section of the fourth texture 1130) to the end region 1121 by setting coordinates (x, y) of a center point 1131 of the fourth texture 1130 to an end point of the primitive 1110. Accordingly, a result 1141 in which the portion of the fourth texture 1130 is mapped to the end region 1121 is output.

Referring back to FIG. 3, in operation 330, the mapper 120 maps the texture along the edge of the primitive. The mapper 120 sequentially maps the texture to certain regions set based on each pixel included in the primitive.

In particular, the mapper 120 determines a direction based on the slope of the primitive, and maps the texture along the edge of the primitive in the determined direction. In one example, when the slope of the primitive has a value of 0 or an infinite value, the mapper 120 maps the texture in a direction perpendicular to the primitive. In another example, when the absolute value of the slope of the primitive is larger than 0 and smaller than 1, the mapper 120 maps the texture in the horizontal direction of the frame. In another example, when the absolute value of the slope of the primitive is equal to or larger than 1 and is not infinity, the mapper 120 maps the texture in the vertical direction of the frame.

Examples in which the mapper 120 maps a texture along the edge of a primitive are described below with reference to FIGS. 12 to 13B.

Figure 12:
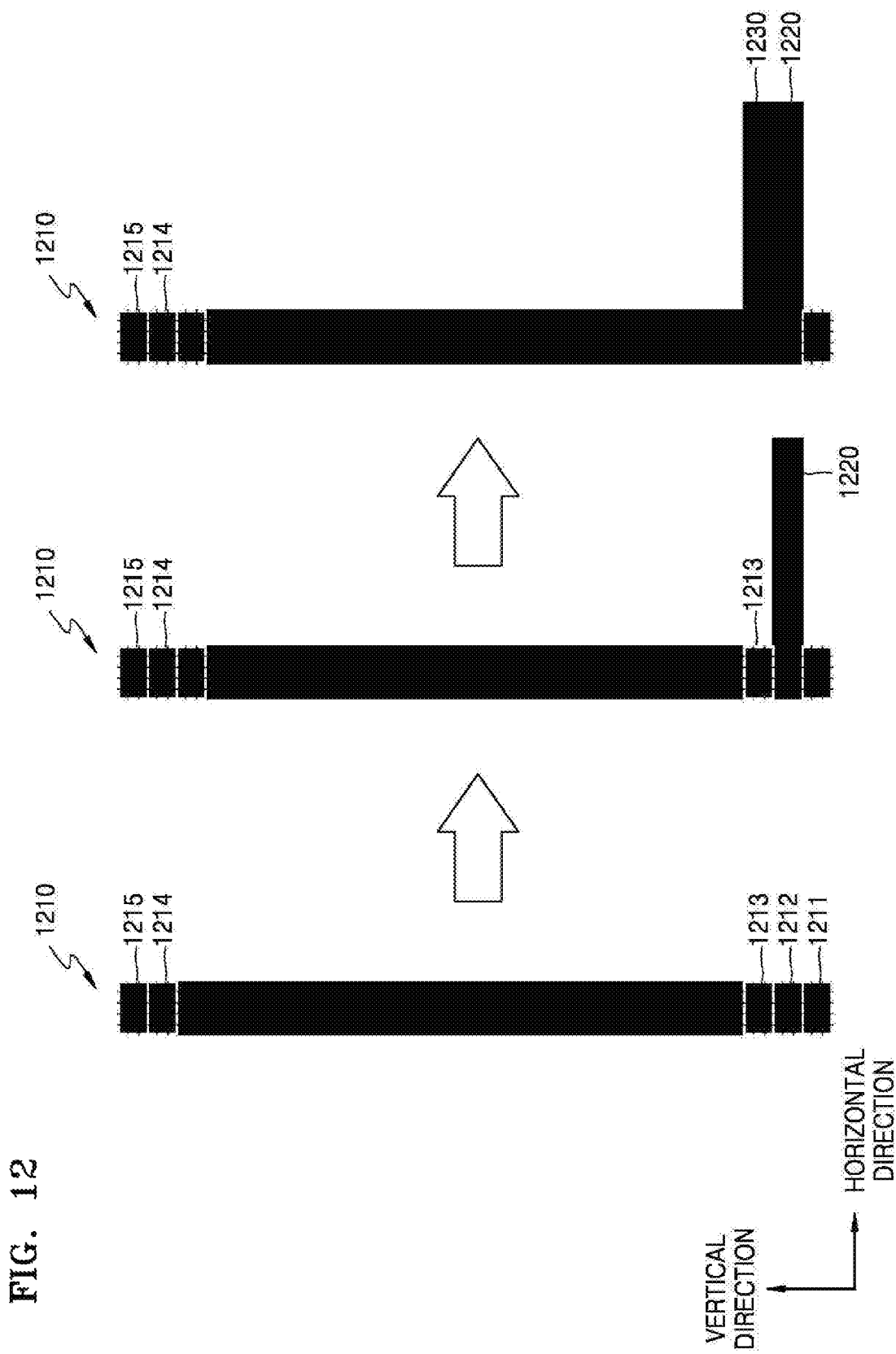
FIG. 12 is a diagram illustrating an example of an operation of a mapper.

FIG. 12 is a diagram illustrating an example of an operation of a mapper.

In FIG. 12, an example of a primitive 1210 is shown. In FIG. 12, it is assumed that the primitive 1210 is a line, and the slope of the primitive 1210 has an infinite value (i.e., the primitive 1210 is drawn in a vertical direction of a frame).

When the slope of the primitive 1210 has a value of 0 or an infinite value, the mapper 120 maps textures 1220 and 1230 in a direction perpendicular to the primitive 1210. In FIG. 12, the slope of the primitive 1210 has an infinite value, and thus the mapper 120 maps the textures 1220 and 1230 in the horizontal direction of the frame.

The mapper 120 sequentially maps the textures 1220 and 1230 to certain regions set based on pixels 1211, 1212, 1213, 1214, and 1215 included in the primitive 1210. Alternatively, the mapper 120 maps the same texture to certain regions that are symmetric to each other with respect to the positions of the respective pixels 1211, 1212, 1213, 1214, and 1215 in the primitive 1210. The certain regions represent regions corresponding to the whole width of the textures 1220 and 1230. In the case of the first texture, the certain regions represent regions corresponding to the stroke width W, and in the case of the second texture, the certain regions represent regions corresponding to the sum of the first width L and the second width L_AA. Since a stroke width is constant in a certain region of one primitive, it is possible to repeatedly map the same texture to the certain regions.

Referring to FIG. 12, the mapper 120 maps the texture 1220 in a direction perpendicular to the primitive 1210 (i.e., the horizontal direction of the frame) with respect to the pixel 1212. After that, the mapper 120 maps the texture 1230 in the direction perpendicular to the primitive 1210 with respect to the pixel 1213. In this way, the mapper 120 sequentially maps textures to pixels up to the pixel 1214. Also, the mapper 120 maps textures to both the end pixels 1211 and 1215 of the primitive 1210 according to the method described with reference to FIG. 11.

Figure 13A:
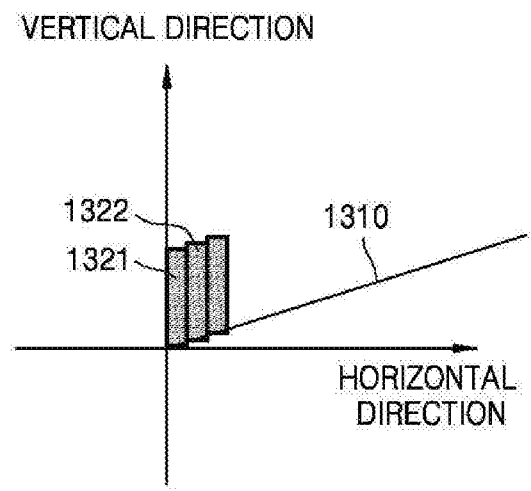
FIGS. 13A and 13B are diagrams illustrating other examples of an operation of a mapper.
Figure 13B:
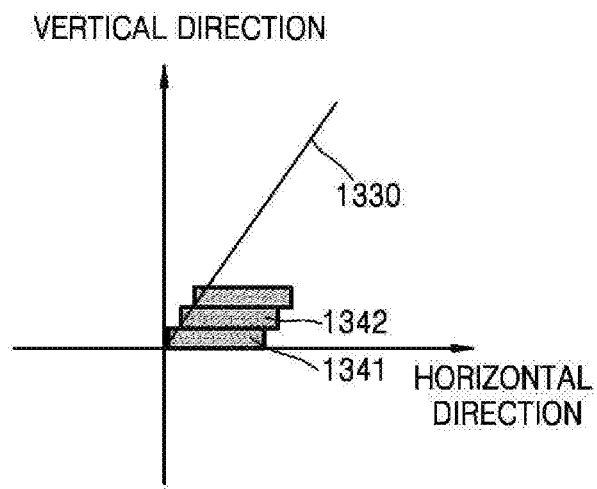

FIGS. 13A and 13B are diagrams illustrating other examples of an operation of a mapper.

In FIGS. 13A and 13B, examples of primitives 1310 and 1330 are shown. The slope of the primitive 1310 shown in FIG. 13A has an absolute value that is larger than 0 and smaller than 1, and the slope of the primitive 1330 shown in FIG. 13B has an absolute value that is larger than 1.

Referring to FIG. 13A, when the absolute value of the slope of the primitive 1310 is larger than 0 and smaller than 1, the mapper 120 maps textures in the vertical direction of a frame. The mapper 120 maps textures 1322 to pixels included in the primitive 1310 other than both end pixels of the primitive 1310 in the vertical direction of the frame. Also, the mapper 120 maps textures 1321 to both end pixels of the primitive 1310 according to the method described with reference to FIG. 11.

Referring to FIG. 13B, when the absolute value of the slope of the primitive 1330 is larger than 1, the mapper 120 maps textures in the horizontal direction of a frame. The mapper 120 maps textures 1342 to pixels included in the primitive 1330 other than both end pixels of the primitive 1330 in the horizontal direction of the frame. Also, the mapper 120 maps textures 1341 to both end pixels of the primitive 1330 according to the method described with reference to FIG. 11.

According to the above description, the stroke apparatus 100 adaptively generates textures according to a characteristic of a primitive (e.g., the slope of the primitive) and stores the textures. Also, by mapping the textures stored in a local memory having a high processing speed to the primitive, the stroke apparatus 100 performs a stroking operation in a short time. Further, by mapping the generated textures onto the primitive, the stroke apparatus 100 performs an anti-aliasing operation as well as the stroking operation at the same time.

Figure 14:
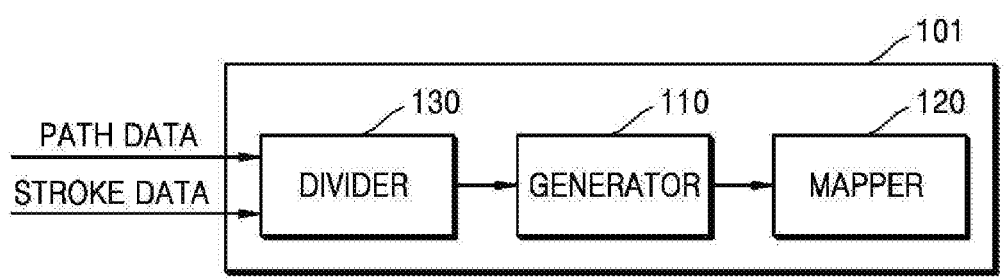
FIG. 14 is a diagram showing a configuration of another example of a stroke apparatus.

FIG. 14 is a diagram showing a configuration of another example of a stroke apparatus.

Referring to FIG. 14, a stroke apparatus 101 not only includes a generator 110 and a mapper 120, but also includes a divider 130. In the stroke apparatus 101 of FIG. 14, only components related to this example are shown. Therefore, in addition to the components shown in FIG. 14, other general-use components involved in performing rendering may be further included.

Operations of the generator 110 and the mapper 120 of the stroke apparatus 101 shown in FIG. 14 are the same as the operations of the generator 110 and the mapper 120 of the stroke apparatus 100 described above with reference to FIGS. 1 to 13B. Therefore, a detailed description of the generator 110 and the mapper 120 is omitted below.

The divider 130 divides a path corresponding to a curve into a plurality of primitives. For example, the divider 130 divides a curve into a plurality of primitives using De Casteljau's algorithm. Each of the divided primitives represents a line.

As described above with reference to FIG. 1, a curve may be included in a path. When a path is a curve, the divider 130 divides the curve into a plurality of primitives, and the generator 110 generates textures for each of the primitives. The divider 130 may generate line primitives to approximate a curve. In other words, a set of line primitives generated by the divider 130 may have a shape similar to a curve. An example of an operation of the divider 130 is described below with reference to FIGS. 15A to 15D.

FIGS. 15A to 15D are diagrams illustrating an example of an operation of a divider.

Figure 15A:
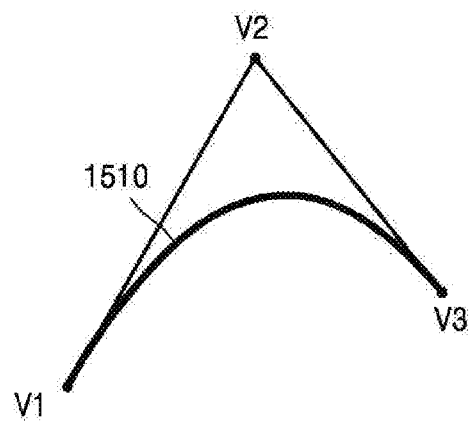
FIGS. 15A to 15D are diagrams illustrating an example of an operation of a divider.

In FIG. 15A, an example of a path 1510 that is a curve is shown. When the path 1510 is a curve, path data includes information on three control points $V_1$, $V_2$, and $V_3$ used to express the path 1510. In other words, the stroke apparatus 100 may configure the path 1510 based on the control points $V_1$, $V_2$, and $V_3$.

Meanwhile, by combining the control points $V_1$, $V_2$, and $V_3$, it is possible to generate two lines. In other words, a first line connecting the control point $V_1$ and the control point $V_2$ and a second line connecting the control point $V_2$ and the control point $V_3$ may be generated. As shown in FIG. 15A, a shape of the first line and the second line connected to each other is significantly different from the shape of the path 1510.

Figure 15B:
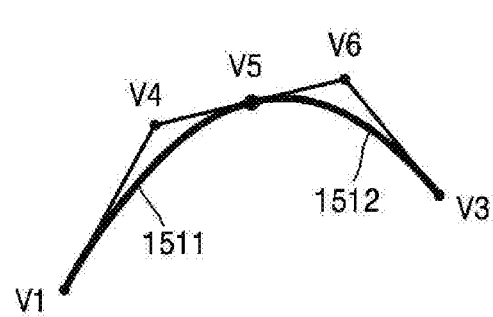

In FIG. 15B, an example in which the path 1510 is divided into two sub-paths 1511 and 1512 is shown. In other words, FIG. 15B shows an example in which one curve is divided into two curves. For example, the path 1510 may be divided based on De Casteljau's algorithm.

As described above with reference to FIG. 15A, the first sub-path 1511 may be composed of three control points $V_1$, $V_4$, and $V_5$, and the second sub-path 1512 may be composed of three control points $V_5$, $V_6$, and $V_3$. Therefore, by combining the control points $V_1$, $V_4$, $V_5$, $V_6$, and $V_3$ of the sub-paths 1511 and 1512, it is possible to generate four lines.

Figure 15C:
Figure 15D:
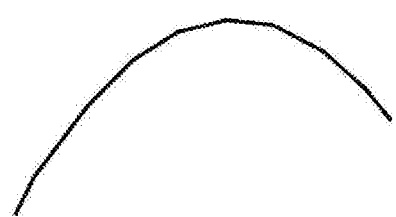

When FIGS. 15A and 15B are compared with each other, the shape of the four lines connected to each other shown in FIG. 15B is more similar to the shape of the path 1510 than the shape of the two lines connected to each other in FIG. 15A. FIG. 15C shows an example in which the path 1510 is divided into four sub-paths, and FIG. 15D shows an example in which the path 1510 is divided into eight sub-paths. In brief, as the number of divisions of the path 1510 increases, the shape of connected lines that have been generated using control points gradually becomes more similar to the shape of the path 1510.

The divider 130 divides the path 1510 into a plurality of sub-paths. Then, the divider 130 configures a plurality of primitives (i.e., lines) by combining control points corresponding to each of the sub-paths. As a result, the divider 130 may divide the path 1510 into a plurality of primitives. The number of times that the divider 130 divides the path 1510 may be determined by a calculation of the stroke apparatus 101, and a previously determined number of times may be changed by a user's input.

Figure 16:
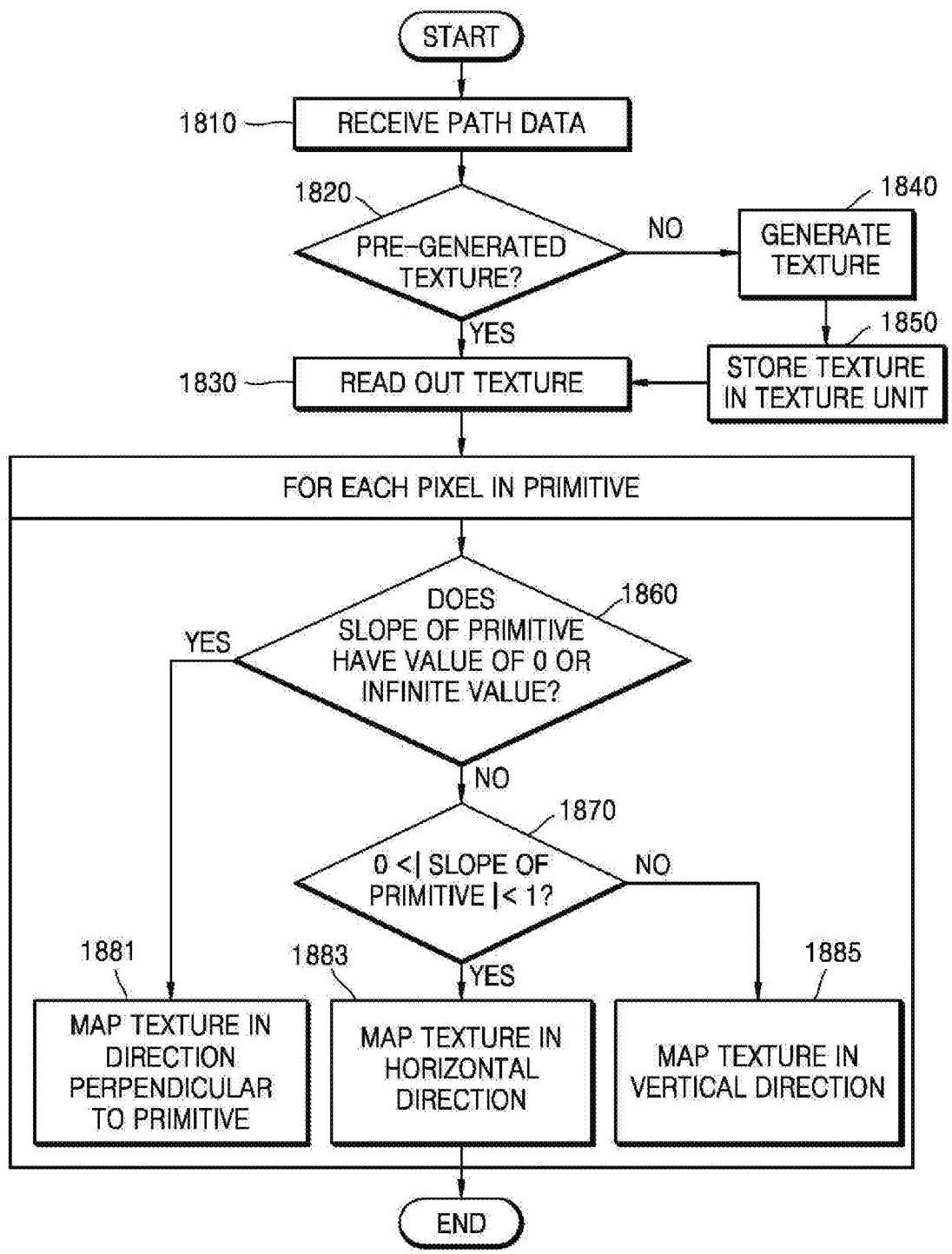
FIGS. 16 and 17 are flowcharts illustrating examples of a method of performing path stroking.
Figure 17:
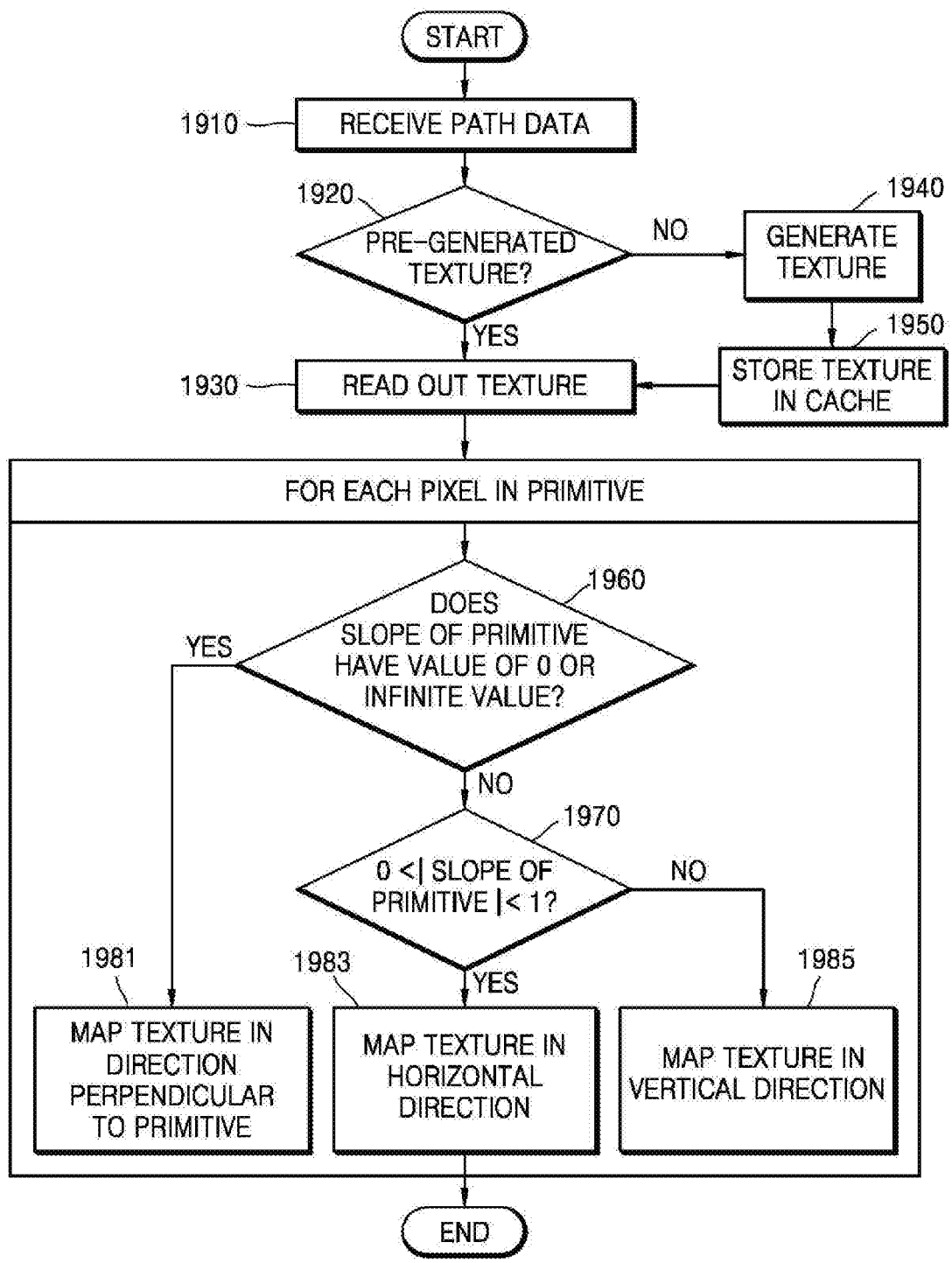

FIGS. 16 and 17 are flowcharts illustrating examples of a method of performing path stroking.

Referring to FIGS. 16 and 17, examples of a method of performing path stroking include operations that are performed in the stroke apparatuses 100 and 101 shown in FIGS. 1 and 14. Therefore, the descriptions of the stroke apparatuses 100 and 101 shown in FIGS. 1 and 14 provided above, even if omitted below, are also applicable to the methods of performing path stroking illustrated in FIGS. 16 and 17.

Referring to FIG. 16, in operation 1810, the generator 110 receives path data from an external apparatus. The path data includes information on coordinates of each of a plurality of vertices included in a path and commands for configuring the path by combining the vertices. Also, the generator 110 receives stroke data from the external apparatus. The stroke data may include at least one piece of information among a stroke width, a stroke color, and a background color.

In operation 1820, the generator 110 determines whether or not there is a pre-generated texture. For example, the generator 110 may determine whether or not there is a pre-generated texture by checking whether or not a texture is stored in a texture unit. When there is a pre-generated texture, the process proceeds to operation 1830. Otherwise, the process proceeds to operation 1840.

In operation 1830, the generator 110 reads out the texture from the texture unit. Then, the generator 110 transmits the read-out texture to the mapper 120. Alternatively, the generator 110 may request the mapper 120 to read out the texture, and the mapper 120 may read out the texture from the texture unit according to the request.

In operation 1840, the generator 110 generates a texture. For example, the generator 110 may determine whether or not aliasing based on a primitive will occur, and generate a texture to be used for performing path stroking based on the result of the determining. The generator 110 may calculate the slope of the primitive using the path data, and determine whether or not aliasing will occur based on the calculated slope. Then, the generator may adaptively generate a texture according to whether or not aliasing will occur. Examples in which the generator 110 generates a texture are described above with reference to FIGS. 6 to 11.

In operation 1850, the generator 110 stores the generated texture in the texture unit.

Operation 1860 to operation 1885 are performed on each pixel included in the primitive. In other words, the mapper 120 performs operation 1860 to operation 1885 on each of the pixels included in the primitive.

In operation 1860, the mapper 120 determines whether or not the slope of the primitive has a value of 0 or an infinite value. For example, the mapper 120 may perform operation 1860 using the slope of the primitive calculated by the generator 110. When the slope of the primitive has a value of 0 or an infinite value, the process proceeds to operation 1881. Otherwise, the process proceeds to operation 1870.

In operation 1870, the mapper 120 determines whether or not the absolute value of the slope of the primitive is larger than 0 and smaller than 1. When the absolute value of the slope of the primitive is larger than 0 and smaller than 1, the process proceeds to operation 1883. Otherwise, the process proceeds to operation 1885.

In operation 1881, the mapper 120 maps the texture in a direction perpendicular to the primitive. An example in which the mapper 120 maps a texture in a direction perpendicular to a primitive is described above with reference to FIG. 12.

In operation 1883, the mapper 120 maps the texture in a horizontal direction. The horizontal direction is a horizontal direction of a frame. An example in which the mapper 120 maps a texture in a horizontal direction is described above with reference to FIG. 13B.

In operation 1885, the mapper 120 maps the texture in a vertical direction. The vertical direction is a vertical direction of the frame. An example in which the mapper 120 maps a texture in a vertical direction is described above with reference to FIG. 13A.

When the flowchart illustrated in FIG. 16 and the flowchart illustrated in FIG. 17 are compared with each other, FIG. 16 shows that the generated texture is stored in the texture unit in operation 1850, while FIG. 17 shows that the generated texture is stored in a cache of a CPU in operation 1950. Among operation 1910 to operation 1985 illustrated in FIG. 17, operations other than operation 1950 are the same as operation 1810 to operation 1885 other than operation 1850 illustrated in FIG. 16.

FIGS. 18 to 21 are diagrams illustrating examples in which a method of performing path stroking is implemented in a CPU or a GPU.

Figure 19:
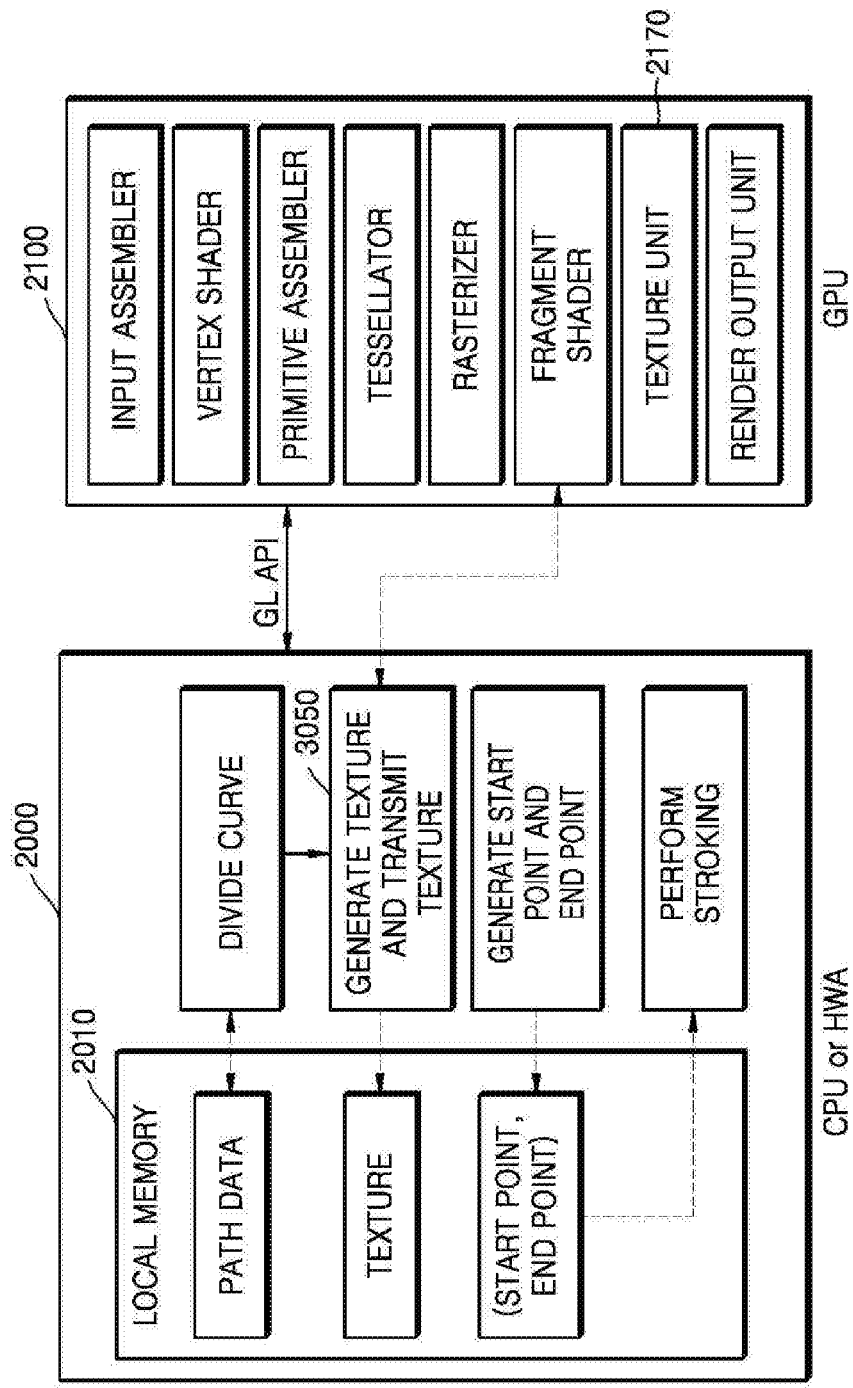
Figure 20:
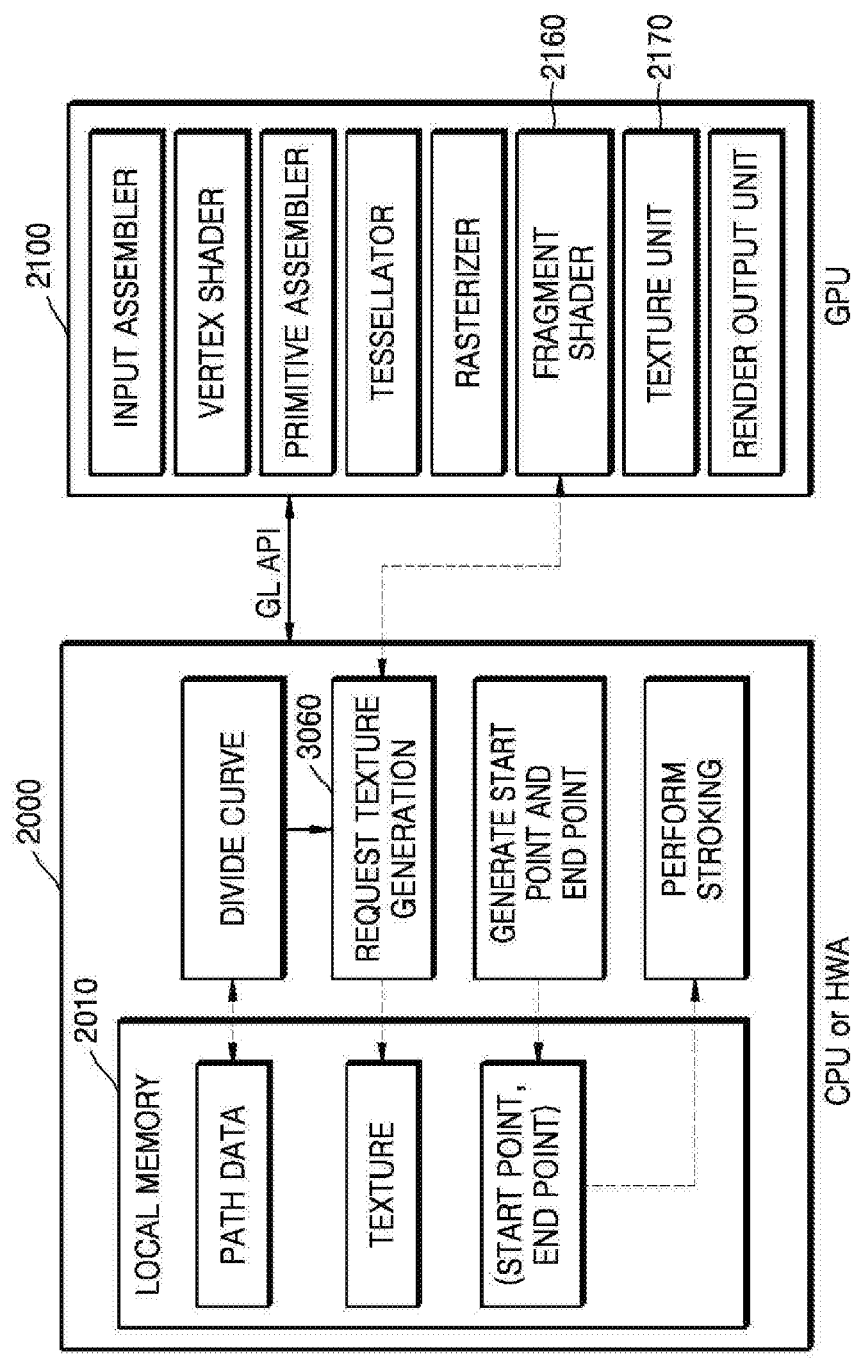
Figure 21:
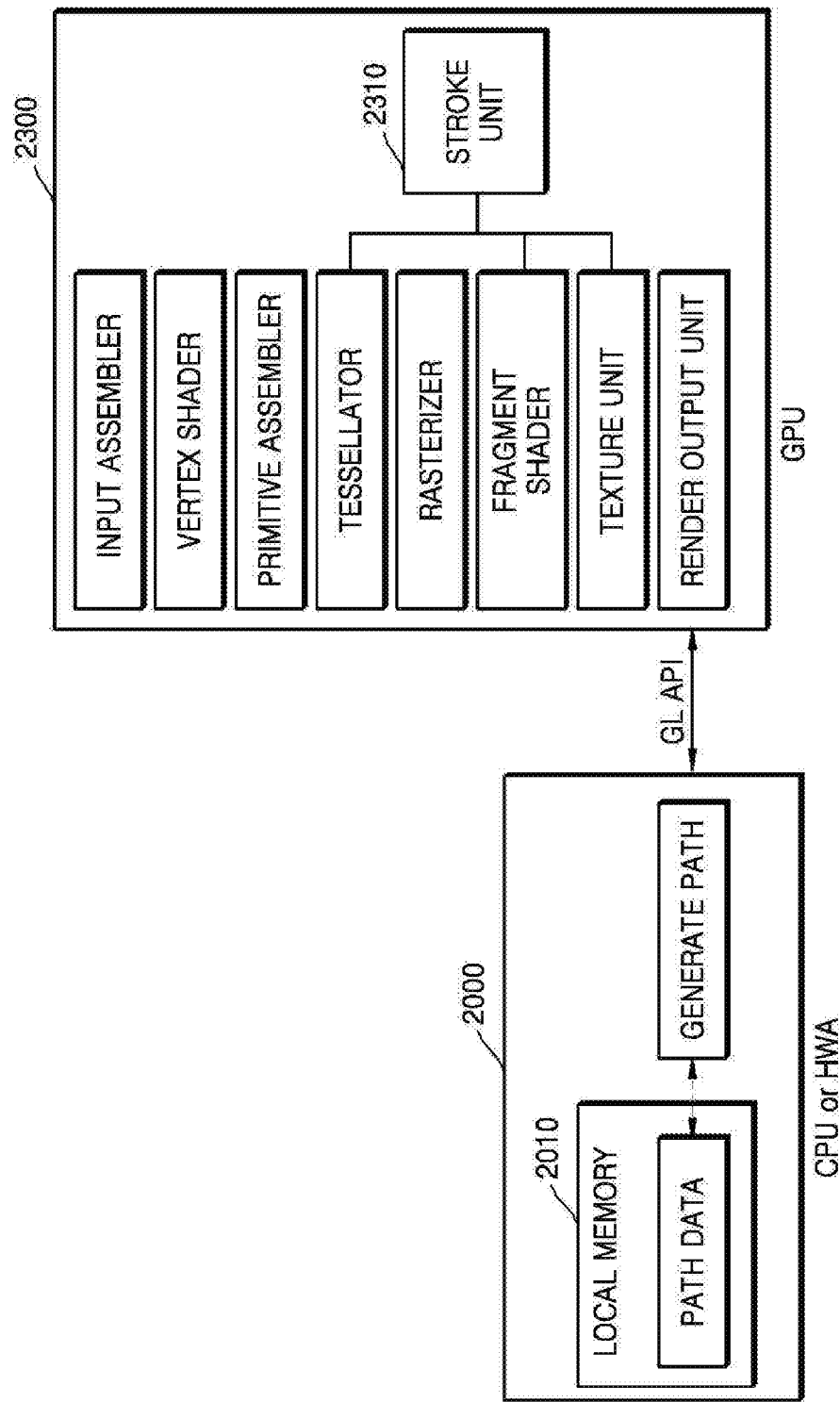

In FIGS. 18 to 21, a CPU 2000 and GPUs 2100 and 2300 are shown. For example, the CPU 2000 and the GPU 2100 or 2300 may communicate with each other through a graphics language (GL) application programming interface (API). In particular, the GPU 2300 shown in FIG. 21 is distinguished from the GPU 2100 shown in FIGS. 18 to 20 in that the GPU 2300 further includes a stroke unit 2310. The CPU 2000 shown in FIGS. 18 to 21 may be implemented as an HWA.

An example in which components included in the GPU 2100 generally operate is as follows.

An input assembler 2110 reads out data about at least one vertex constituting a path from a memory, and transmits the read-out data to a vertex shader 2120. The vertex shader 2120 executes a vertex shader program written by a user for the vertex. The vertex shader program represents a program that generates coordinates of all pixels in a one-dimensional (1D) texture. Pixels whose coordinates have been generated are transferred to a fragment shader 2160 and used as inputs for a fragment shader program defined by the user.

The fragment shader 2160 generates a texture and stores the generated texture in a texture unit 2170. Also, the fragment shader 2160 sets color values for each pixel included in a frame. The fragment shader 2160 may set color values for each of the pixels using the texture stored in the texture unit 2170.

A render output unit 2180 records data (e.g., information on colors of pixels) generated as the fragment shader 2160 operates in a buffer (not shown). In other words, the fragment shader 2160 determines colors of each of the pixels included in the frame, and the render output unit 2180 merges information on the colors of the pixels and records the merged information in the buffer (not shown).

Since a primitive assembler 2130, a tessellator 2140, and a rasterizer 2150 perform the same functions as the same components in a conventional GPU, a detailed description thereof has been omitted.

Figure 18:
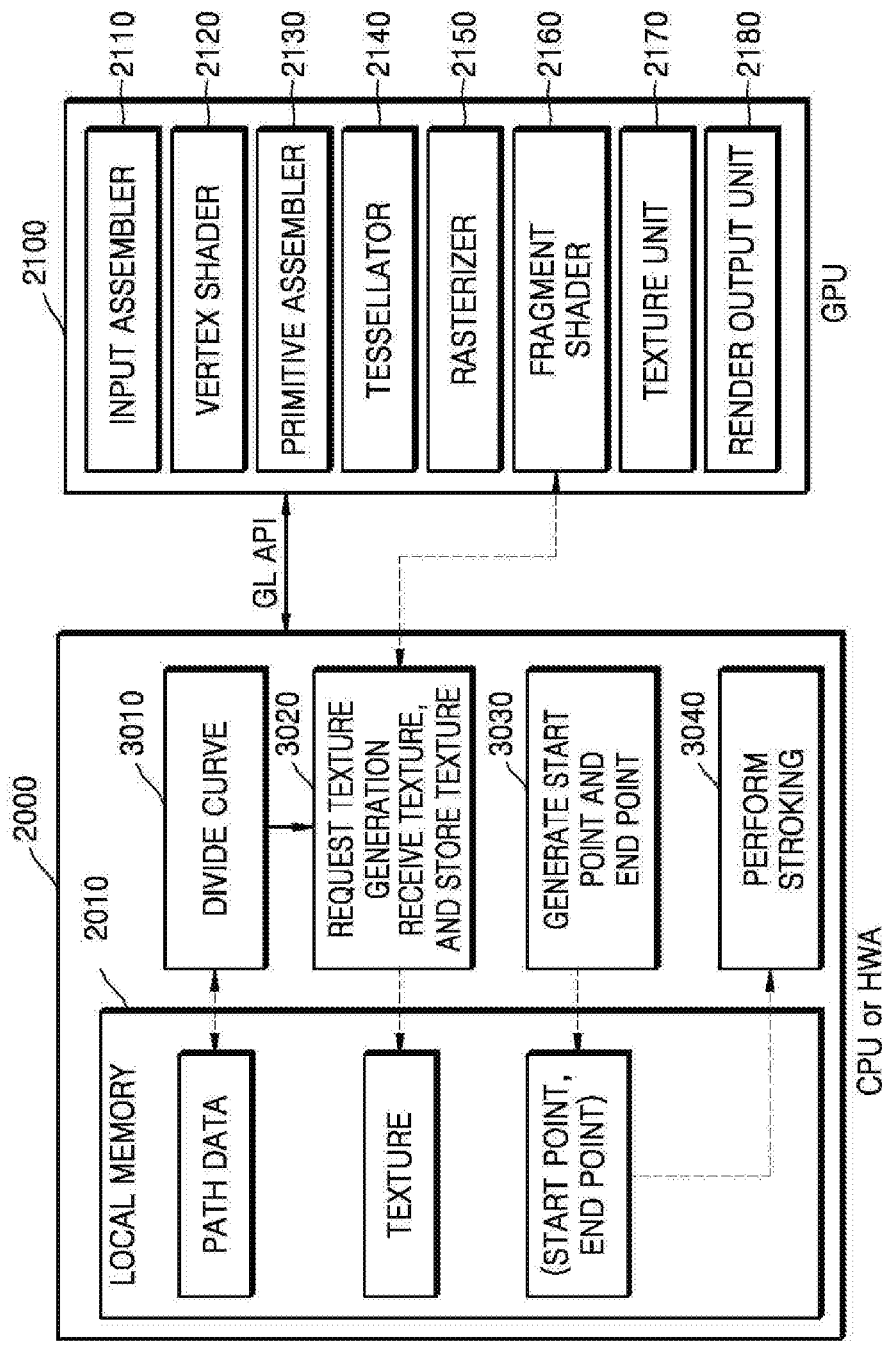
FIGS. 18 to 21 are diagrams illustrating examples in which a method of performing path stroking is implemented in a central processing unit (CPU) or a graphical processing unit (GPU).

Referring to FIG. 18, the CPU or HWA 2000 requests the GPU 2100 to generate a texture using a shader program, and the GPU 2100 generates a texture. In other words, among operations performed by the stroke apparatus 100 or 101, a texture generation operation may be performed by the GPU 2100, and other operations may be performed by the CPU or the HWA 2000.

The CPU or HWA 2000 determines whether or not aliasing based on a primitive will occur using path data stored in a local memory 2010. When the path is a curve, the CPU or HWA 2000 generates primitives by dividing the curve (3010), and determines whether or not aliasing will occur. Also, the CPU or HWA 2000 requests the GPU 2100 to generate textures, receives textures from the GPU 2100, and stores the textures in the local memory 2010 (3020). The fragment shader 2160 of the GPU 2100 generates the textures.

Also, the CPU or HWA 2000 generates start vertices and end vertices of the primitives, and stores information on the start vertices and the end vertices in the local memory 2010 (3030). Then, the CPU or HWA 2000 maps the textures using the textures and the information on the start vertices and the end vertices stored in the local memory, thereby performing a stroking operation (3040).

When FIGS. 18 and 19 are compared with each other, the CPU or HWA 2000 shown in FIG. 19 is distinguished from the CPU or HWA 2000 shown in FIG. 18 in that it generates the textures by itself, stores the generated textures in the local memory 2010, and transmits the generated textures to the GPU 2100 (3050). The GPU 2100 stores the received textures in the texture unit 2170. Storing the generated textures in the local memory 2010 enables the CPU or HWA 2000 to determine whether a pre-generated texture exists for a current path, similar to operation 1820 in FIG. 16 and operation 1920 in FIG. 17.

In general, the texture unit 2170 includes a cache memory. Therefore, when a texture is repeatedly used during a stroking operation, the texture may be read out at a high speed.

When FIGS. 18 and 20 are compared with each other, the CPU or HWA 2000 shown in FIG. 20 is distinguished from the CPU or HWA 2000 shown in FIG. 18 in that it requests the GPU 2100 to generate the textures and does not receive the generated textures (3060). The fragment shader 2160 of the GPU 2100 generates the textures and stores the generated textures in the texture unit 2170. Since the generated textures are stored in the texture unit 2170, the CPU or HWA 2000 may call the GL API to request the GPU 2100 to perform a stroking operation during which the CPU 2100 performs texture mapping using the generated textures stored in the texture unit 2170.

When FIGS. 18 and 21 are compared with each other, the CPU or HWA 2000 shown in FIG. 21 is distinguished from the CPU or HWA 2000 shown in FIG. 18 in that it requests the GPU 2300 to perform all operations performed by the stroke apparatuses 100 and 101.

The GPU 2300 determines whether or not aliasing based on a primitive will occur using path data. When the path is a curve, the GPU 2300 generates primitives by dividing the curve, and determine whether or not aliasing will occur. Also, the GPU 2300 generates textures to be used for performing path stroking, and maps the textures along the edges of the primitives. The stroke unit 2310 included in the GPU 2300 maps the textures along the edges of the primitives.

According to the examples described above, the stroke apparatuses 100 and 101 perform a stroking operation using a pre-generated texture. Therefore, the amount of calculations necessary for the stroking operation is reduced, and the stroking operation may be performed in a short time.

Also, the stroke apparatuses 100 and 101 adaptively generate a texture based on whether or not aliasing will occur, so that a stroking operation and an anti-aliasing operation may be simultaneously performed.

The stroke apparatus 100, the generator 110, and the mapper 120 in FIG. 1, the stroke apparatus 101, the generator 110, the mapper 120, and the divider 130 in FIG. 14, the CPU or HWA 2000 and the local memory 2010 in FIGS. 18-21, the GPU 2100 in FIGS. 18-20, the GPU 2300 in FIG. 21, the input assembler, the vertex shader, the primitive assembler, the tessellator, the rasterizer, the fragment shader, the texture unit, and the render output unit in FIGS. 18-21, and the stroke unit 2310 in FIG. 21 that perform the operations described herein are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4, 8, 16, and 17 that perform the operations described herein are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing path stroking, the method comprising:
    identifying path data and stroke data for a first primitive and a second primitive, wherein the stroke data for each primitive includes a stroke color and a stroke width;
    determining that aliasing will not occur based on a slope of the first primitive calculated using the path data for the first primitive;
    generating a first texture using the stroke color for the first primitive in response to determining that the aliasing will not occur, wherein the first texture does not apply a gradient effect to the stroke color for the first primitive, does not comprise an anti-aliasing portion and is configured to apply the stroke color for the first primitive to pixels corresponding to the stroke width for the first primitive;
    mapping the first texture a plurality of times, such that an edge of the first texture or is mapped along an edge of the first primitive;
    determining that aliasing will occur based on a slope of the second primitive;

generating a second texture using the stroke color for the second primitive and a color obtained by applying the gradient effect to the stroke color for the second primitive in response to determining that the aliasing will occur, wherein the second texture is configured to apply the stroke color for the second primitive to pixels corresponding to the stroke width for the second primitive and the gradient effect to pixels beyond the stroke width for the second primitive; and mapping the second texture a plurality of times, such that an edge of the second texture is mapped along an edge of the second primitive.

2. The method of claim 1, wherein determining that the aliasing will not occur is based on the slope of the first primitive having a value of 0 or an infinite value; and determining that the aliasing will occur is based on the slope of the second primitive having neither a value of 0 nor an infinite value.

3. The method of claim 1, wherein the first texture is generated corresponding to the stroke width for the first primitive in response to the determining that the aliasing will not occur; and the second texture is generated longer than the stroke width for the second primitive in response to the determining that the aliasing will occur.

4. The method of claim 3, wherein the generating of the second texture comprises generating the second texture based on an angle corresponding to the slope of the primitive and the stroke width for the second primitive.

5. The method of claim 3, wherein the generating of the second texture comprises generating the second texture by applying the stroke color for the second primitive to a portion of the second texture corresponding to the stroke width for the second primitive, and applying the color obtained by applying the gradient effect to the stroke color for the second primitive to a portion of the second texture exceeding the stroke width for the second primitive.

6. The method of claim 1, wherein the mapping the first texture comprises sequentially mapping the first texture to certain regions set based on each pixel included in the first primitive.

7. The method of claim 6, wherein the certain regions comprise regions having a width corresponding to a width of the first texture based on the pixels included in the first primitive.

8. The method of claim 1, wherein the mapping the first texture comprises mapping the first texture in a direction determined based on the slope of the first primitive.

9. The method of claim 8, wherein the first texture is mapped in a direction perpendicular to the first primitive in response to the slope of the first primitive having a value of 0 or an infinite value;

the second texture is mapped in a horizontal direction in response to the slope of the second primitive having an absolute value larger than 0 and smaller than 1, in a vertical direction in response to the slope of the second primitive having neither a value of 0 nor an infinite value and having an absolute value equal to or larger than 1.

10. The method of claim 1, further comprising dividing a path into a plurality of primitives in response to the path being a curve.

11. The method of claim 10, wherein the dividing comprises dividing the path that is the curve into the plurality of primitives based on De Casteljau's algorithm.

12. A non-transitory computer-readable storage medium storing instructions that, when executed by a processor, cause the processor to perform the method of claim 1.

13. An apparatus for performing path stroking, the apparatus comprising:

a generator configured to:

identify path data and stroke data for a primitive, wherein the path data includes two or more vertices and one or more commands for connecting the two or more vertices, and wherein the stroke data includes a stroke color and a stroke width;

determine whether or not aliasing will occur based on a slope of the primitive calculated using the path data;

generate a first texture using the stroke color in response to a result of the determining being that the aliasing will not occur, wherein the first texture does not apply a gradient effect to the stroke color, does not comprise an anti-aliasing portion and is configured to apply the stroke color to pixels corresponding to the stroke width;

generate a second texture using the stroke color and a color obtained by applying the gradient effect to the stroke color in response to a result of the determining being that the aliasing will occur, wherein the second texture is configured to apply the stroke color to pixels corresponding to the stroke width and the gradient effect to pixels beyond the stroke width; and a mapper configured to map the first texture or the second texture a plurality of times, such that an edge of the first texture or the second texture is mapped along an edge of the primitive between the two or more vertices.

14. The apparatus of claim 13, wherein the generator is further configured to:

determine that the aliasing will not occur in response to the slope of the primitive having a value of 0 or an infinite value, and determine that the aliasing will occur in response to the slope of the primitive having neither a value of 0 nor an infinite value.

15. The apparatus of claim 13, wherein the generator is further configured to:

generate the first texture corresponding to a stroke width in response to the result of the determining being that the aliasing will not occur, and generate the second texture longer than the stroke width in response to the result of the determining being that the aliasing will occur.

16. The apparatus of claim 15, wherein the generator is further configured to generate the second texture based on an angle corresponding to the slope of the primitive and the stroke width.

17. The apparatus of claim 15, wherein the generator is further configured to generate the second texture by applying the stroke color to a portion of the second texture corresponding to the stroke width, and applying a color obtained by applying the gradient effect to the stroke color to a portion of the second texture exceeding the stroke width.

18. The apparatus of claim 13, wherein the mapper is further configured to sequentially map the first texture or the second texture to certain regions set based on each pixel included in the primitive.

19. The apparatus of claim 18, wherein the certain regions comprise regions having a width corresponding to a width of the first texture or the second texture based on the pixels included in the primitive.

20. The apparatus of claim 13, wherein the mapper is further configured to map the first texture or the second texture in a direction determined based on the slope of the primitive.

21. The apparatus of claim 20, wherein the mapper is further configured to:
map the first texture or the second texture in a direction perpendicular to the primitive in response to the slope of the primitive having a value of 0 or an infinite value,
map the first texture or the second texture in a horizontal direction in response to the slope of the primitive having an absolute value larger than 0 and smaller than 1, and
map the first texture or the second texture in a vertical direction in response to the slope of the primitive having neither a value of 0 nor an infinite value and having an absolute value equal to or larger than 1.

22. The apparatus of claim 13, further comprising a divider configured to divide the path into a plurality of primitives in response to the path being a curve;
wherein the generator is further configured to determine whether or not aliasing based on each of the plurality of primitives will occur.

23. The apparatus of claim 22, wherein the divider is further configured to divide the path that is the curve into the plurality of primitives based on De Casteljau's algorithm.

24. A central processing unit (CPU) connected to a graphics processing unit (GPU), wherein the CPU is configured to:
identify path data and stroke data for a primitive, wherein the path data includes one or more vertices and one or more commands for connecting the one or more vertices, and wherein the stroke data includes a stroke color and a stroke width;
determine whether or not aliasing will occur based on a slope of the primitive calculated using the path data,
request the GPU to generate a texture based on a result of the determining whether or not aliasing will occur,
receive a first texture or a second texture from the GPU, and
map the first texture or the second texture a plurality of times, such that an edge of the first texture or the second texture is mapped along an edge of the primitive between the one or more vertices; and
the GPU is configured to:
receive the request to generate the texture from the CPU, and
generate a first texture using a stroke color in response to a result of the determining being that the aliasing will not occur, wherein the first texture does not comprise an anti-aliasing portion, does not apply a gradient effect to the stroke color, and is configured to apply the stroke color to pixels corresponding to the stroke width;
generate a second texture using the stroke color and a color obtained by applying the gradient effect to the stroke color in response to a result of the determining being that the aliasing will occur, wherein the second texture is configured to apply the stroke color to pixels corresponding to the stroke width and the gradient effect to pixels beyond the stroke width.

25. The CPU of claim 24, wherein the CPU is further configured to store the first texture or the second texture in the CPU.

26. The CPU of claim 24, wherein the GPU is further configured to store the first texture or the second texture in the GPU.

27. A graphics processing unit (GPU) connected to a central processing unit (CPU), wherein the GPU is configured to:
determine whether or not aliasing will occur for a first primitive and a second primitive in a path using data about the path including a slope of the first primitive and a slope of the second primitive;
generate a first texture using a stroke color for the first primitive based on determining that the aliasing will not occur for the first primitive based on the slope of the first primitive, wherein the first texture does not apply a gradient effect to the stroke color for the first primitive, and does not comprise an anti-aliasing portion and wherein the GPU is configured to apply the stroke color for the first primitive to pixels corresponding to a stroke width for the first primitive;
generate a second texture for the second primitive using a stroke color for the second primitive and a color obtained by applying the gradient effect to the stroke color for the second primitive based on determining being that the aliasing will occur for the second primitive based on the slope of the second primitive; and
map the first texture along an edge of the first primitive and the second texture along an edge of the second primitive.

28. The GPU of claim 27, wherein the CPU is further configured to store the data about the path in the CPU; and
the GPU is further configured to receive the data about the path from the CPU.

29. An apparatus for performing path stroking, the apparatus comprising:
a generator configured to determine whether or not aliasing will occur for a primitive included in a path based on a slope of the primitive calculated using data about the path, and to adaptively generate a first texture using a stroke color if a result of the determining indicates aliasing will not occur, wherein the first texture does not comprise an anti-aliasing portion, does not apply a gradient effect to the stroke color, and includes the stroke color for a number of pixels corresponding to a stroke width, and wherein the generator is configured to generate a second texture using the stroke color and a color obtained by applying the gradient effect to the stroke color to counteract the aliasing; and
a mapper configured to perform stroking by mapping the first texture or the second texture along an edge of the primitive.

30. The apparatus of claim 29, wherein the generator is further configured to:
generate the first texture by applying the stroke color to a portion of the first texture having a length equal to the stroke width, the first texture not comprising any other portion, and
generate the second texture by applying the stroke color to a first portion of the second texture having a length equal to the stroke width, and applying the color obtained by applying the gradient effect to the stroke color to a second portion of the second texture.

31. The apparatus of claim 29, wherein the mapper is further configured to perform the stroking by mapping the first texture or the second texture along the primitive so that one end of the first texture or the second texture is on the primitive and a texture extends away from the primitive.

32. The apparatus of claim 29, where the mapper is further configured to perform the stroking by mapping the first texture or the second texture along the primitive so that one end of the first texture or the second texture is on the primitive and the first texture or the second texture extends away from the primitive in opposite directions to obtain a final stroke width equal to twice a width of the first texture or the second texture.

\* \* \* \* \*